US006757283B1

(12) United States Patent
Yamanaka et al.

(10) Patent No.: US 6,757,283 B1
(45) Date of Patent: Jun. 29, 2004

(54) PUSH NETWORK

(75) Inventors: Naoaki Yamanaka, Tokyo (JP); Eiji Oki, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/490,283

(22) Filed: Jan. 24, 2000

(30) Foreign Application Priority Data

| Jan. 25, 1999 | (JP) | 11-015872 |
| Jan. 25, 1999 | (JP) | 11-015877 |
| Apr. 2, 1999 | (JP) | 11-096940 |
| Apr. 2, 1999 | (JP) | 11-096945 |
| Apr. 5, 1999 | (JP) | 11-098101 |

(51) Int. Cl.[7] .............................................. H04L 12/28
(52) U.S. Cl. ...................................... 370/390; 370/432
(58) Field of Search ....................... 370/351.3, 389–390, 370/395.1, 395.3, 395.31, 432, 445, 449, 450; 709/200–203; 725/105–6, 109–10, 114–121, 74, 78, 86–104

(56) References Cited

U.S. PATENT DOCUMENTS

| 4,750,135 | A | | 6/1988 | Boilen |
| 5,721,827 | A | | 2/1998 | Logan et al. |
| 5,740,375 | A | | 4/1998 | Dunne et al. |
| 5,790,554 | A | | 8/1998 | Pitcher et al. |
| 6,202,081 | B1 | * | 3/2001 | Naudus ...................... 709/200 |
| 6,496,502 | B1 | * | 12/2002 | Fite, Jr. et al. .............. 370/389 |
| 6,545,982 | B1 | * | 4/2003 | Murthy et al. .............. 370/245 |
| 6,549,516 | B1 | * | 4/2003 | Albert et al. ................ 370/236 |

FOREIGN PATENT DOCUMENTS

| EP | 0 561 381 A2 | 9/1993 |
| EP | 0 915 598 | 5/1999 |
| JP | 9-238321 | 9/1997 |
| JP | 10-75219 | 3/1998 |
| JP | 2893019 | 2/1999 |
| JP | 11-103450 | 4/1999 |

OTHER PUBLICATIONS

Yamanaka et al., "High–speed Push Service Network Architecture," The Institute of Electronics, Information and Communication Engineers, Technical Report of IEICE, SSE98–17G, OCS98–77 (1999–01).

Mostafa et al., "A Multilevel Approach To Intelligent Information Filtering: Model, System, and Evaluation" ACM Transactions on Information Systems, US, Association For Computing Machinery, New York, vol. 15, No. 4, Oct. 1, 1997 (Oct. 1, 1999), pp. 368–399, XP000723801 ISSN: 1046–8188.

* cited by examiner

*Primary Examiner*—David Vincent
(74) *Attorney, Agent, or Firm*—Pillsbury Winthrop LLP

(57) ABSTRACT

To transfer push service traffic efficiently, a packet is given a content identifier for identifying the content of the packet, or is given one or both of this content identifier and a category identifier for identifying the category to which the content belongs; and a user registers in advance in the distribution network content identifier related information or one or both of this content identifier related information and category identifier related information, said information relating to content and/or categories that the user wishes to have sent; and the distribution network passes content, or one or both of content and category, wanted by a downstream user. A table for filtering is set by taking into account content identifier related information that has been notified by a user. To make effective use of memory resources in the table in each node of the distribution network, a content identifier, or one or both of a content identifier and a category identifier, that has been registered in the table but which has become unnecessary, is deleted. Moreover, to ensure that a decrease in throughput at some packet distribution destinations does not affect the throughput of the entire network, means is provided for temporarily storing a packet at a transit node, so that when a packet transfer destination is experiencing decreased throughput, a decrease in throughput at transit nodes upstream of the site of the throughput decrease can be avoided by storing packets in this temporary storage means.

29 Claims, 38 Drawing Sheets

| | SA | COI | RQ |
|---|---|---|---|

FIG.26

| | routing information | SA | COI | RQ |
|---|---|---|---|---|

FIG.29

| | passed nodes | distance | HL | COI | RQ |
|---|---|---|---|---|---|
| | | | | | |

FIG.34

| | content transfer route | COI | CFS |
|---|---|---|---|
| | | | |

| category identifier | content identifier |
|---|---|
| CAI = # 1 | × |
| CAI = # 2 | C = 3 |
|  | C = 4 |
| CAI = # 3 | * * * * |

× : no content with this category identifier is to be passed
* * * * : all content with this category identifier is to be passed

PUSH NETWORK

CROSS REFERENCE TO RELATED APPLICATIONS

The present invention claims priority from Japanese Patent Applications No.11-015872 filed Jan. 25, 1999, No.11-015877 filed Jan. 25, 1999, No.11-096940 filed Apr. 2, 1999, No.11-096945 filed Apr. 2, 1999 and No.11-098101 filed Apr. 5, 1999, the contents of which are incorporated herein by reference.

BACKGROUND OF THE INVENTION

1. Field of the Invention

This invention can be utilized for a push service which copies and distributes content to a plurality of destinations. In this specification, "push service" signifies a service which copies and distributes, to a plurality of user terminals, a packet sent by an information providing terminal, wherein the information providing terminal can transfer packets at a regular interval or at a prescribed time without knowing the state of the user terminals. Users can operate the user terminals whenever they wish and can extract the information that has been distributed.

2. Description of Related Art

FIGS. 44, 45 and 46 serve to explain the configuration of a conventional datagram network, indicating respectively the configuration of a conventional packet, a conventional network and a conventional multicast packet. The network shown in FIG. 45 has router 30 which has routing table 20, and when a packet with address DA as shown in FIG. 44 is sent into the network from a source, router 30 passes this packet if the address in question is downstream of the router.

There is only one such address in the network and if it is desired to send the packet to a plurality of addresses, a plurality of copies of the packet are formed as indicated in FIG. 46, and these are sent within the network after respective addresses have been added (DA1, DA4, . . . , DA7).

It is anticipated that future multimedia networks will see an increase in push services and that this will be accompanied by an increase in traffic comprising packets being multicast to a plurality of destinations. Networks of the sort described hitherto will not be able to deal with this situation efficiently. Push services have recently been increasing on the Internet as well, and content ranging from weather forecasts to the latest technical news is now being automatically distributed. However, this kind of service cannot operate efficiently over point-to-point networks that use conventional unique addresses.

For example, a packet sent from a source has to be copied and the addresses of a plurality of destinations have to be respectively added to the copied packets. In other words, it is necessary to generate a large number of packets to which as many different addresses as there are destinations have been added, and it takes time to generate such packets.

Moreover, in a situation where the destinations to which a packet is to be distributed are not fixed but are constantly changing, it is difficult for the source to ascertain these changes in real time, with the result that a packet may be generated for an address that has already been released. Alternatively, it may be impossible to generate a packet for a newly added address.

Another consequence can be that information which users did not request is distributed, or that information with the desired content is not distributed at all. Because information with undesired content will end up being deleted by users without being utilized, such information constitutes redundant traffic for the distribution network.

Given this background technology, it is an object of this invention to provide a push network capable of generating, by simple means, packets for use in a push service. It is a further object of this invention to provide a push network capable of responding in real time to changes in the addresses to which a packet is to be distributed. It is yet another object of this invention to provide a push network which ensures that only information with content and/or of a category which users desire is distributed. A further object of the invention is to provide a push network capable of efficiently transferring push service traffic. Yet another object of this invention is to provide a push network capable of making effective use of the memory resources in each node of a distribution network.

SUMMARY OF THE INVENTION

The principal distinguishing features of this invention are as follows. Firstly, it adds to a packet a content identifier for identifying the content, or, if a category to which the content belongs can be identified, one or both of a content identifier and a category identifier for identifying the category to which the content belongs. Secondly, a user registers in advance in the distribution network content identifier related information, or one or both of content identifier related information and category identifier related information, said information relating to the content and/or category which the user wishes to receive. Thirdly, the distribution network has content filters, or one or both of content filters and category filters, which pass packets with content, or with one or both of content and categories, wanted by a downstream user. This invention differs from the prior art in that the user sets the packet format, how the filter table is used, and the identifiers corresponding to the required content and/or category.

Namely, this invention is a push network comprising means for copying information held in a packet sent from an information providing terminal and for generating a plurality of packets with the same information, and means for distributing the packets thereby generated to a plurality of user terminals.

The distinguishing features of this invention are that it provides means for adding to a packet a content identifier for identifying the content of the information held in that packet, or for adding one or both of this content identifier and a category identifier for identifying the category to which the content belongs; and that the aforementioned distributing means comprises means for deciding, in accordance with the aforementioned content identifier, or in accordance with one or both of the aforementioned content identifier and category identifier, whether or not to distribute that packet to a given user terminal.

For example, means can be provided for adding a content identifier to a packet, and the distributing means can comprise means for deciding, in accordance with the content identifier, whether or not to distribute that packet to a given user terminal.

In this case, the decision means preferably includes a table, provided in correspondence with a destination, in which content identifier related information has been registered; and means for passing a packet if the content identifier added to that packet matches the content identifier related information registered in the table.

Means is preferably provided for registering content identifier related information in this table in accordance with notification from a user.

The result of these provisions is that it is not necessary to add, to each of a plurality of multicast packets, a respective and separate destination identifier uniquely assigned within the distribution network. Instead, it is sufficient to add the same identifier to the plurality of multicast packets, this identifier serving to identify the content of that packet, thereby simplifying the packet generation procedure.

Because the user constituting the destination can himself register in the table content identifier related information, the distribution network can recognize the content required by the user, so that transfer of useless packets can be avoided. As a result, increase in traffic is suppressed. Moreover, because the user does not receive useless packets, received information can be processed efficiently. Furthermore, because the user registers content in the distribution network, even if the situation of a user constituting a destination is constantly changing, the source can still distribute content without having to be aware of these changes.

It follows that use of a push network according to this invention enables push service traffic to be transferred efficiently.

A content identifier that has been registered in the table but which has become unnecessary is preferably deleted.

Namely, means is preferably provided for deleting from the table content identifier related information registered in the table, once a series of packets to which that content identifier has been added have passed. This ensures that a content identifier that has become unnecessary does not remain in the table indefinitely, and that memory resources can be utilized effectively.

The aforementioned deleting means can alternatively comprise means for deleting the aforementioned content identifier related information from the table after a prescribed time interval has elapsed after the series of packets have passed. This ensures that if, after a series of packets having the same content identifier have passed, yet another packet with the same content identifier is generated, this further packet can be passed, provided a fixed time interval is not exceeded.

The deleting means can alternatively comprise means for deleting from the table, at a predetermined time, content identifier related information registered in the table.

This ensures that a content identifier relating to content which becomes invalid at a certain time can be deleted irrespective of whether or not there is a packet, thereby enabling effective utilization of memory resources. Moreover, if a packet is erroneously transferred at a time when the information has already become invalid, then because the content identifier is deleted at a certain time, transfer of invalid packets can be avoided.

The aforementioned decision means can alternatively comprise means for receiving a packet requesting deletion of content identifier related information, and for deleting the corresponding content identifier related information from the aforementioned table. In this case, the aforementioned user terminal or information providing terminal preferably comprises means for transmitting a packet requesting deletion of the aforementioned content identifier related information.

For example, information relating to the route from an information providing terminal to a user can be written in a packet arriving at that user, and means can be provided whereby that user sends a packet requesting deletion of content identifier related information in accordance with this routing information; and a node having an aforementioned table can comprise means for receiving this packet requesting deletion and for deleting from the table the corresponding content identifier related information. This ensures that if there is content regarding which distribution had been desired but which has become unnecessary, the user can delete the corresponding content identifier related information from the table by notifying the distribution network to this effect.

Content identifier related information can thus be deleted at the discretion of a user or of an information provider. The distribution of content which has become unnecessary can therefore be made to stop by the user. Moreover, if there is a destination which wishes to prohibit distribution of information, the information provider can implement this by deleting content identifier related information corresponding to that destination.

The aforementioned decision means can alternatively comprise means which, if no packet having the same content identifier as that of passed packets arrives within a fixed time interval after the final packet has passed, deletes from the table the information relating to that content identifier. This ensures that each node can autonomously detect content whereof distribution has already been completed, and can delete the corresponding content identifier related information from the table.

Alternatively, the decision means can comprise means for deleting content identifier related information from the table when it receives a packet giving notification that receiving has been completed, said packet having been sent from a node or user that has received packets to which the corresponding content identifier has been added. This makes it possible to confirm that a packet has reached its destination before deleting the corresponding content identifier related information, thereby avoiding the situation where content identifier related information is erroneously deleted from a table before a packet has reached its destination.

The aforementioned registering means preferably comprises means for receiving a request packet in which has been written a content identifier relating to content desired by a user, and means for registering content identifier related information in the aforementioned table in accordance with the content identifier written in the request packet received by this receiving means.

This mechanism enables content which a user desires to be registered in the distribution network. Because the distribution network only has to distribute content required by the user, push service traffic can be efficiently transferred.

One registering means can be provided for a plurality of decision means. In this case, the registering means preferably comprises: means for storing, in correspondence with content, information indicative of the information providing terminal constituting the source of packets with that content; means for searching for a route from that information providing terminal to a given user terminal in accordance with the stored contents of this storage means; and means which, in accordance with the result of the search conducted by this searching means, registers content identifier related information notified by a user, in the tables of the decision means along the route in question.

Thus, in order to register, in the table of each decision means, content identifier related information notified by a user, it is necessary to search for a route from the information providing terminal in question to the user terminal in question, and to register, in the tables of the nodes on that route, the content identifier related information notified by the user. This invention stores, in correspondence with content, information indicative of the information providing terminal constituting the source of packets with that content, and searches for a route on the basis of this.

Alternatively, a separate registering means can be provided for each decision means. In this case, the registering means preferably comprises: means for storing, in correspondence with content, information indicative of the information providing terminal constituting the source of packets with that content; means for searching, in accordance with the stored contents of this storage means, for a route from that information providing terminal to a given user terminal; and means for transferring an arriving request packet in accordance with information, written in that request packet, regarding the route to the information providing terminal. This transferring means preferably includes means which, when there is no information in an arriving request packet regarding the route to the information providing terminal, writes said information in that request packet, in accordance with the routing information found by the search means.

Thus, if a large number of registering means are provided in non-centralized fashion, then for example the node which first receives a request packet searches for a route from the-information providing terminal in question to the user terminal in question and writes routing information in the request packet. Once the routing information has been written, it is no longer necessary for subsequent nodes to conduct a route search. Instead, they can simply transfer the request packet in accordance with this routing information.

The registering means can alternatively comprise: means for storing, in correspondence with content, information indicative of the information providing terminal constituting the source of packets with that content; means for searching, in accordance with the stored contents of this storage means, for a route to the information providing terminal written in an arriving request packet; and means which, in accordance with the results of the search by this search means, updates the routing information in the aforementioned request packet. If a route search is conducted each time a request packet arrives at a node, then even if an unsuitable route has been found by a node downstream from the information providing terminal, the routing information can be modified by subsequent upstream nodes. For example, if a transmission line fault occurs in the distribution network while a request packet is being transferred, it is possible that the route found by the node nearest the user terminal will already have become an unsuitable route. Under such circumstances, a suitable route can always be selected by updating the routing information at each node.

The registering means can comprise means for storing, in correspondence with information relating to the address of an information providing terminal, said information having been written in an arriving request packet, information relating to an output port to be used for routing.

If this is done, each node must hold routing information for transferring packets to the next node, but does not have to hold information relating to the topology of the entire distribution network, and therefore the amount of information held by each node can be decreased.

The registering means can alternatively comprise: means for sending an arriving request packet to all output routes connected to the local node (i.e., the node containing the registering means); means for writing in a request packet information relating to the sending history of this sending means; means for detecting, in accordance with this sending history information, the number of hops made by the request packet; and means which, when the same packet arrives from a plurality of routes, selects one of these packets in accordance with the result obtained by this detection means.

This makes it unnecessary for each node to hold full information, such as information on the topology of the entire distribution network, or even routing information up to the next node. If a plurality of the same request packets arrive, then for example the packet having the fewest number of hops can be selected.

There can also be provided means for temporarily storing a packet which the decision means has decided to distribute. This temporary storage means preferably comprises means for temporarily storing a packet to be transferred to a transfer destination when the packet acceptance rate of that packet transfer destination is less than a prescribed rate.

Namely, by providing means for temporarily storing a packet at a transit node and storing a packet in this temporary storage means when a packet transfer destination is experiencing decreased throughput, a decrease in throughput at transit nodes upstream of the site of throughput decrease can be avoided.

Thus, by providing means for temporarily storing a packet which it has been decided to distribute, if throughput decreases at a location in the distribution network, a packet to be transferred to this location is stored by the temporary storage means when it has reached the immediately preceding location in the distribution network. Consequently, a packet can be transferred at locations upstream of the location where throughput has decreased without being affected by this decrease in throughput, thereby ensuring that a decrease in throughput at some distribution destinations does not affect the entire distribution network.

If there are a plurality of information providing terminals, it is also preferable to provide means which causes a token to circulate among these terminals, this token giving permission to an information providing terminal to send; and to provide means which causes content to be sent from the information providing terminal that has received the token.

This ensures that collision of packets sent from the plurality of information providing terminals is avoided.

Transit nodes can be arranged hierarchically between information providing terminals and user terminals, with a plurality of information providing terminals or transit nodes provided in each layer of this hierarchy. In this case, each layer of the hierarchy can comprise: means for collecting traffic information for that hierarchical layer; means which gives sending permission to the plurality of information providing terminals and/or transit nodes in accordance with the traffic information collected by this collecting means; and means which causes content to be sent from the information providing terminal and/or transit node that has received sending permission.

This ensures that collision of packets sent from a plurality of information providing terminals or transit nodes is avoided, and that packets are transferred in accordance with the traffic situation. For example, control can be implemented whereby packet transfer from an information providing terminal or transit node experiencing downstream traffic congestion can be avoided, and whereby packet transfer from an information providing terminal or transit node with relatively little downstream traffic is given preference.

In the examples given so far, a push network according to this invention has been implemented using only content identifiers. Examples will now be given in which a push network according to this invention is implemented using one or both of content identifiers and category identifiers.

Namely, means can be provided for adding to a packet a content identifier for identifying the content of the information held in that packet, and a category identifier for identifying the category to which that content belongs; and the aforementioned distributing means can comprise means for deciding, in accordance with this content identifier and/or category identifier, whether or not to distribute that packet to a given user terminal.

In this case, the aforementioned decision means preferably includes a table, provided in correspondence with a destination, in which has been registered information relating to the aforementioned category identifier and/or to the aforementioned content identifier corresponding to this category identifier; and also preferably includes means which passes a packet if the category identifier given to that packet matches the category identifier related information registered in this table, and if the content identifier given to the packet matches the content identifier related information registered in the table in correspondence with this category identifier.

Means can alternatively be provided for registering in the aforementioned table, in accordance with notification from a user, information relating to a content identifier and/or a category identifier corresponding to information content which that user wishes to receive, or to information content which the user wishes to reject. Alternatively, means can be provided for registering in the aforementioned table, in correspondence with a destination and in accordance with notification from an information provider, information relating to a content identifier and/or a category identifier corresponding to information content which that information provider wishes to distribute or to prohibit from being distributed.

Namely, this invention adds to a packet one or both of a content identifier and a category identifier for identifying the content and category of the information in that packet, and the user (i.e., the destination) registers in the distribution network in advance information relating to a content identifier and/or a category identifier corresponding to information content which that user wishes to receive or wishes to reject. Because each node in the distribution network has a filter which passes a packet when it contains information with content and/or of a category which a downstream user requires, transfer of unwanted packets to a user can be avoided.

This ensures that no packet of a specified category can pass, or conversely, that a packet of a specified category can pass unconditionally. A user is thus able to select a packet to be sent to the user by category as well as by content. This enables a user to perform finer filtering than when using content alone to select what packets are sent. Alternatively, by registering in the table only category identifier related information and setting the condition that content is not to be taken into consideration, a user can broaden the range of information that is selected. Moreover, the distribution network can implement efficient filtering by performing content-based filtering once rough filtering has been carried out by means of a category.

Instead of adding an individual user address to each separate packet, by simply adding to a packet a content identifier and/or a category identifier, an information provider can distribute a packet to a user who requires packets with that content and/or of that category.

Alternatively, by ensuring that an information provider can register in advance in the distribution network a content identifier and/or a category identifier corresponding to information content which that information provider wishes to distribute—or which it prohibits from being distributed—to specific destinations, the information provider can proactively distribute to specific users information with specific content and/or of a specific category, or can prohibit the distribution of that information to specific users.

The configuration of the means for deleting information relating to a content identifier and/or a category identifier that has been registered in the table, and the configuration of the means for registering such information, are similar to the configurations, described above, when just a content identifier is used. Namely, the means for deleting information can comprise means for deleting from the table information relating to a content identifier and/or a category identifier, once a series of packets containing that content identifier and/or category identifier have passed. This deleting means can alternatively comprise means for deleting from the table information relating to a content identifier and/or a category identifier after a prescribed time interval has elapsed after the aforementioned series of packets have passed, or it can comprise means for deleting from the table, at a predetermined time, information relating to a content identifier and/or a category identifier registered in the table. Alternatively, the decision means can comprise means for receiving a packet requesting deletion of information relating to a content identifier and/or a category identifier, and for deleting the corresponding information from the aforementioned table.

In this case, a user terminal can comprise means for transmitting a packet requesting deletion of information relating to a content identifier and/or a category identifier, or an information providing terminal can comprise means for transmitting a packet requesting deletion of information relating to a content identifier and/or a category identifier.

The aforementioned decision means can alternatively comprise means which, if no packet having the same content identifier and/or category identifier as passed packets arrives within a fixed time interval after the final packet has passed, deletes from the table the information relating to that content identifier and/or category identifier. Alternatively, the decision means can comprise means for deleting from the table information relating to a content identifier and/or a category identifier when it receives a packet giving notification that receiving has been completed, said packet having been sent from a node or user terminal that has received packets with the corresponding content identifier and/or category identifier.

The aforementioned registering means can comprise means for receiving a request packet in which has been written a content identifier and/or a category identifier notified by a user, and means for registering content identifier and/or category identifier related information in the aforementioned table in accordance with the content identifier and/or category identifier written in the request packet received by this receiving means. One registering means can be provided for a plurality of decision means. In this case, the registering means comprises: means for storing, in correspondence with content and/or category, information indicative of the information providing terminal constituting the source of packets with that content and/or of that category; means for searching for a route from that information providing terminal to a given user terminal in accordance with the stored contents of this storage means; and means which, in accordance with the result of the search conducted by this searching means, registers content identifier and/or category identifier related information notified by a user, in the tables of the decision means along the route in question.

Alternatively, a separate registering means can be provided for each decision means. In this case, the registering means can comprise: means for storing, in correspondence with content and/or category, information indicative of the information providing terminal constituting the source of packets with this content and/or of this category; means for searching, in accordance with the stored contents of this storage means, for a route from that information providing terminal to a given user terminal; and means for-transferring an arriving request packet in accordance with information, written in the request packet, regarding the route to the information providing terminal. This transferring means includes means which, when there is no information in an arriving request packet regarding the route to the information providing terminal, writes said information in that request packet, in accordance with the routing information found by the search means. The registering means can alternatively comprise: means for storing, in correspondence with content and/or category, information indicative of the information providing terminal constituting the source of packets with that content and/or of that category; means for searching, in accordance with the stored contents of this storage means, for a route to the information providing terminal written in an arriving request packet; and means which, in accordance with the result of the search by this search means, updates the routing information in the aforementioned request packet. The registering means can alternatively comprise means for storing, in correspondence with information relating to the address of an information providing terminal, said information having been written in an arriving request packet, information relating to an output port to be used for routing. The registering means can alternatively comprise: means for sending an arriving request packet to all output routes connected to the local node; means for writing in a request packet information relating to the sending history of this sending means; means for detecting, in accordance with this sending history information, the number of hops made by the request packet; and means which, when the same packet arrives from a plurality of routes, selects one of these packets in accordance with the results obtained by this detection means.

The examples described above have used either content identifiers alone, or both content identifiers and category identifiers. However, examples using category identifiers alone could also be considered. Such examples could be described in a similar way by simply replacing the terms "content" and "content identifier" in the previously given descriptions of examples using content identifiers alone with the terms "category" and "category identifier".

As has been described above, this invention is capable of generating, by simple means, packets for use in a push service. It is also capable of responding in real time to changes in the addresses to which a packet is to be distributed. Moreover, it ensures that only information with content and/or of a category which users desire is distributed. It is therefore capable of efficiently transferring push service traffic. It is also capable of making effective use of the memory resources in each node of a distribution network.

BRIEF DESCRIPTION OF THE DRAWINGS

Specific embodiments of the present invention will now be described, by way of example only, with reference to the accompanying of drawings in which:

FIG. 26 shows the configuration of a request packet in the eighth embodiment.

FIG. 29 serves to explain a request packet in the ninth embodiment.

FIG. 34 serves to explain a request packet in the twelfth embodiment.

FIG. 35 serves to explain a content filter setting packet in the twelfth embodiment.

DETAILED DESCRIPTION OF THE PREFERRED EMBODIMENTS

The configuration of a push network according to a first embodiment of this invention will be described with reference to FIGS. 1 to 3. As illustrations of this first embodiment, FIG. 1 shows the configuration of a push network, FIG. 2 shows the configuration of a packet, and FIG. 3 shows the configuration of a content filter.

Figure 1:
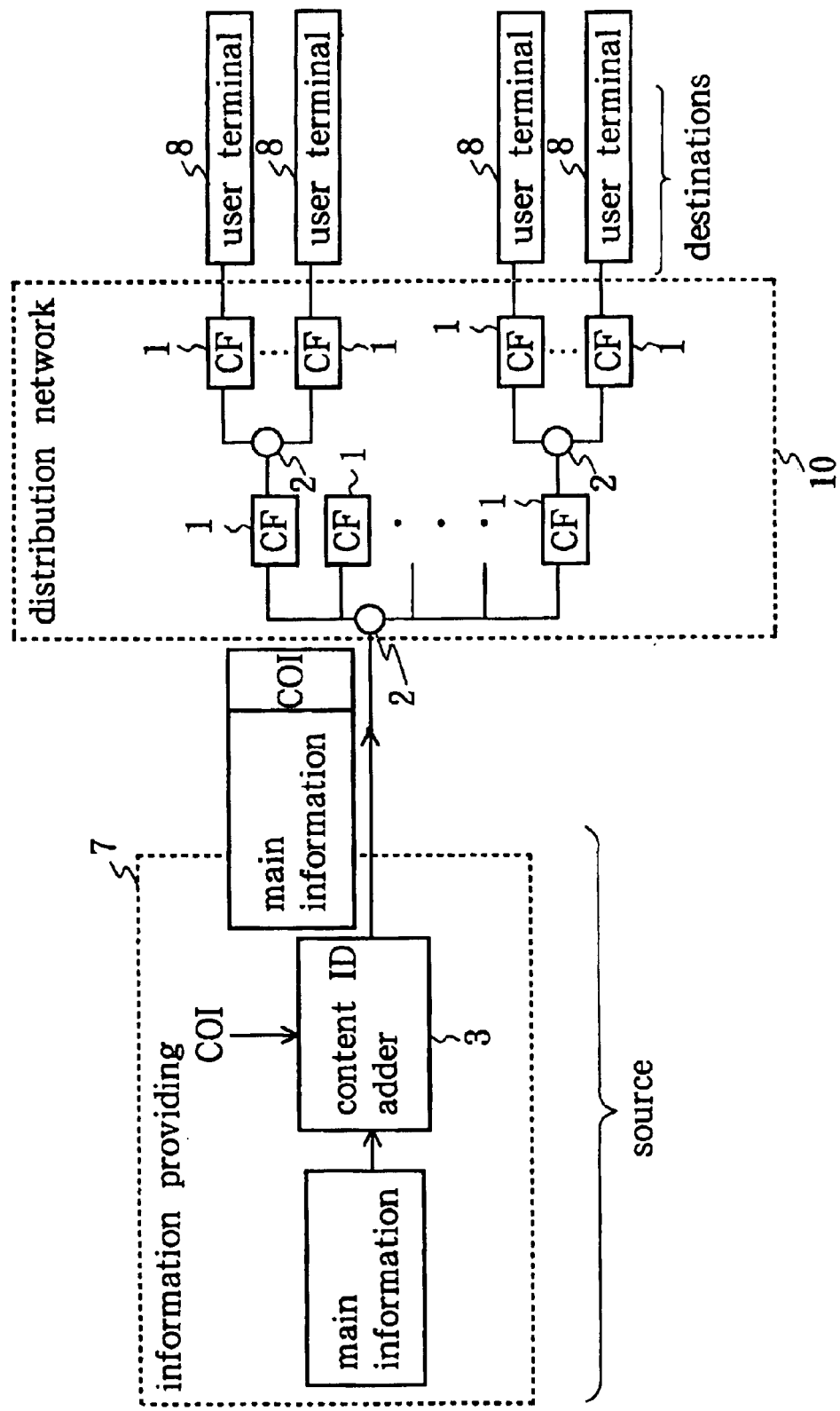
FIG. 1 shows the configuration of a push network according to a first embodiment of this invention.
Figure 2:
FIG. 2 shows the configuration of a packet according to the first embodiment.

As shown in FIG. 1, in this first embodiment the invention is a push network comprising copying nodes 2 and distribution network 10, wherein copying nodes 2 are means for copying information held in a packet sent from information providing terminal 7 and for generating a plurality of packets with this same information, and distribution network 10 is means for distributing packets generated by copying nodes 2 to a plurality of user terminals 8.

A distinguishing feature of this embodiment of the invention is that, as shown in FIG. 1, content ID adder 3 is provided, this being means for adding to a packet a content identifier for identifying the content of the information held in that packet. A further distinguishing feature of this embodiment is that distribution network 10 comprises content filters 1, these being means for deciding, in accordance with these content identifiers, whether or not to distribute to a given user terminal 8 a packet in which a content identifier has been added.

Figure 3:
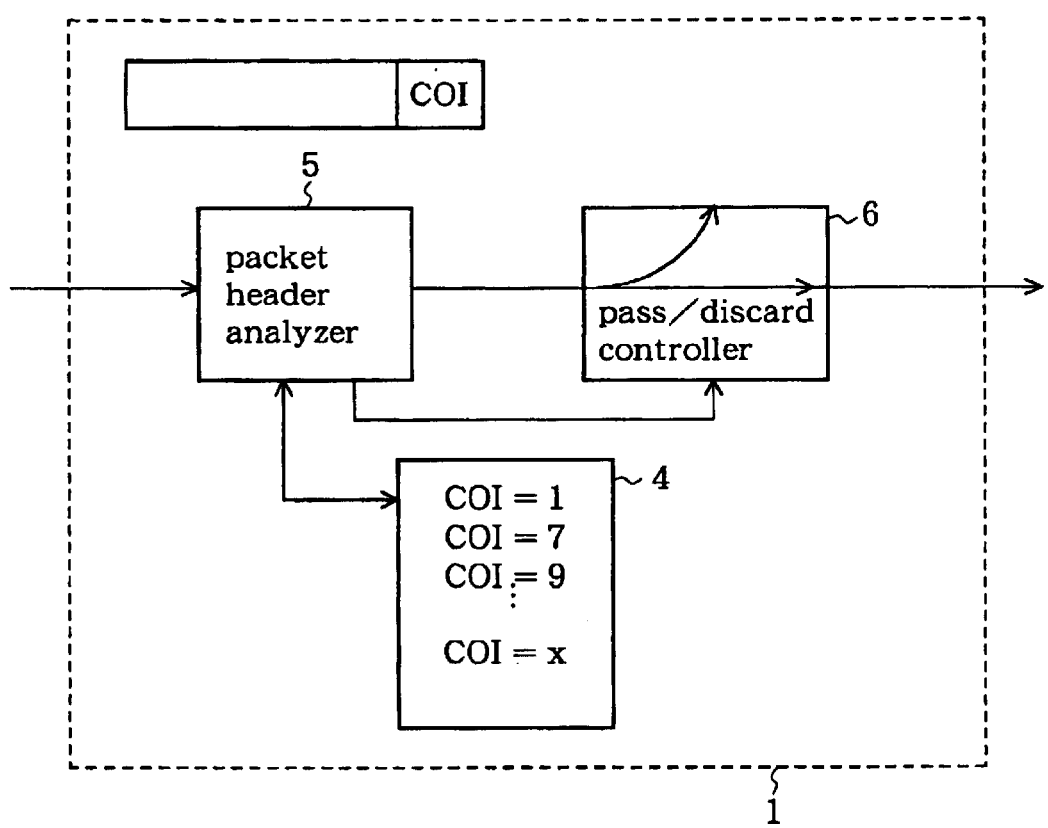
FIG. 3 shows the configuration of a content filter according to the first embodiment.

As shown in FIG. 3, a content filter 1 includes table 4, provided in correspondence with a destination, in which content identifier related information has been registered; and also includes pass/discard controller 6, this being means for passing a packet if the content identifier added to that packet matches the content identifier related information registered in table 4. Content identifier related information can be registered in table 4 in accordance with notification from a user.

Figure 4:
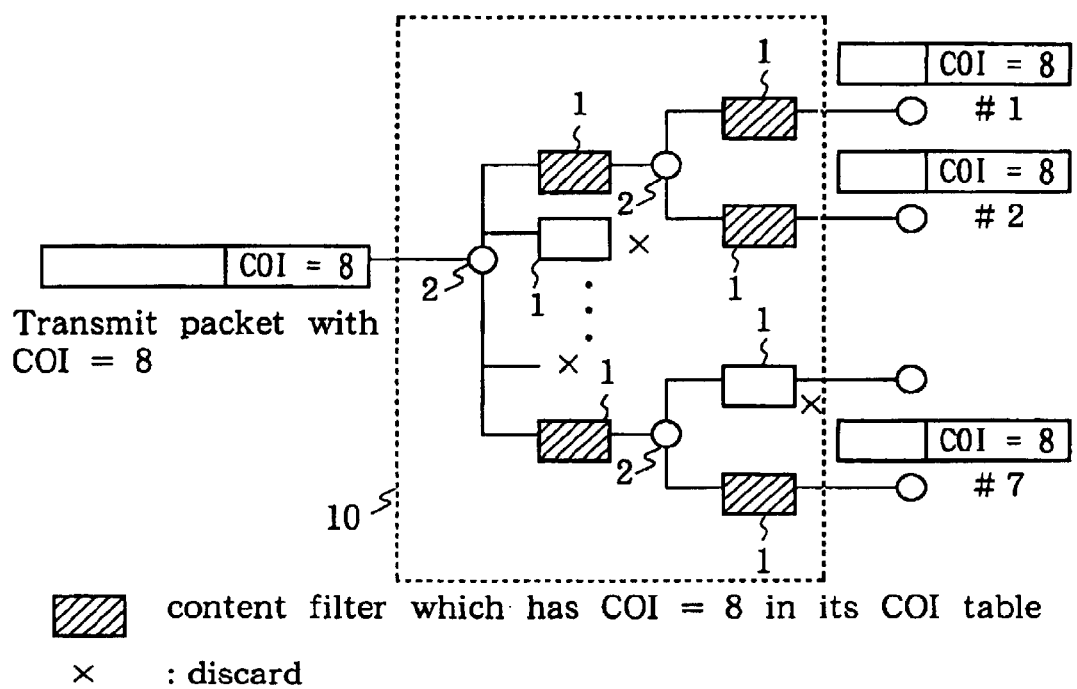
FIG. 4 shows a specific example of distribution in a push network according to the first embodiment.

The operation of a push network according to this first embodiment will be described with reference to FIGS. 1 to 4. FIG. 4 shows a specific example of distribution in the push network of this first embodiment. As shown in FIG. 3, content filter 1 comprises table 4 for registering content identifier related information that has been notified by a user; packet header analyzer 5 for reading and comparing the content identifier (COI) in a packet; and pass/discard controller 6 for deciding whether to pass or to discard a packet.

A packet that has arrived has its COI bits read by packet header analyzer 5, and if that COI value has been stored in table 4, pass/discard controller 6 passes that packet, while if the COI value is not stored in table 4, the packet is discarded. Addition to and deletion from table 4 are performed by "require" and "do not require" commands from a user.

A user sends in advance to distribution network 10 content identifier related information corresponding to content which that user requires. Each content filter 1 registers this content identifier related information in its table 4. Each content has a unique content identifier, just as for example a television program has a unique Video Plus code.

A packet that has been transferred into distribution network 10 from a source has its content identifier deciphered by packet header analyzer 5 of a content filter 1. If this content identifier matches the content identifier related information registered in table 4, pass/discard controller 6 of the content filter passes that packet. On the other hand, if the content identifier does not match the content identifier related information registered in the table, it discards the packet.

In the example given in FIG. 4, users #1, #2 and #7 send notification to distribution network 10 that "content identifier (COI)=8". This notification is received in distribution network 10 and "COI=8" is registered in table 4 of content filters 1 involved in the transfer of packets to users #1, #2 and #7. Consequently, packets sent from the source and having content identifier (COI)=8 pass through content filters 1 involved in the transfer of packets to users #1, #2 and #7, and are thereby transferred to these users.

Thus, provided that a source distributes content at regular intervals, packets will continue to be transferred in multicast fashion to users who have made a request in advance.

Second embodiment

The configuration of a push network according to a second embodiment of this invention will be described with reference to FIGS. 2, 5 and 6. Although FIG. 2 shows the configuration of a packet in the first embodiment, it applies to the second embodiment as well. As illustrations of this second embodiment, FIG. 5 is a block diagram of the main parts of a push network, and FIG. 6 is a block diagram of the main parts of a content filter.

Figure 5:
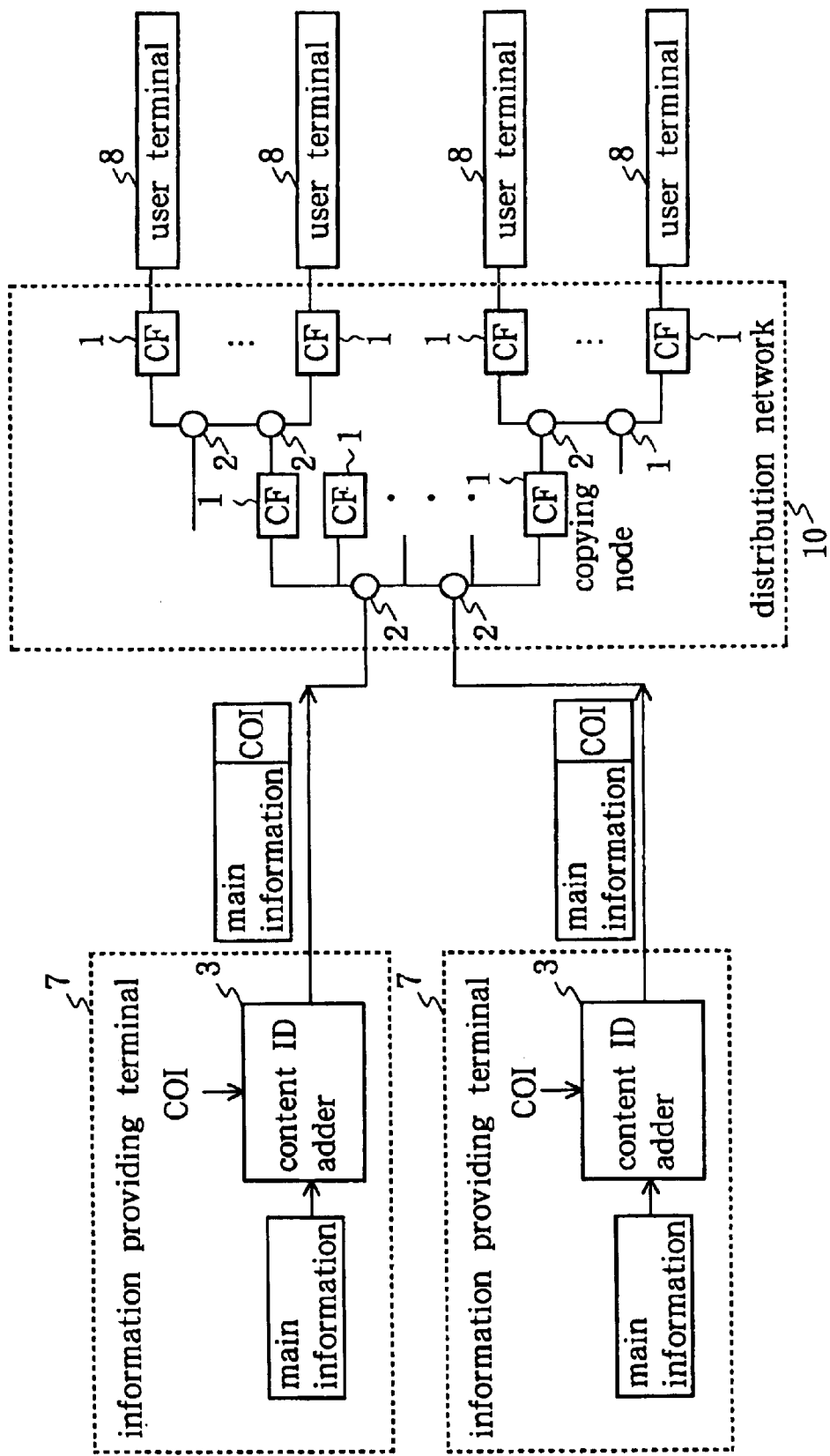
FIG. 5 is a block diagram of the main parts of a push network according to a second embodiment of this invention.

As shown in FIG. 5, in this second embodiment the invention is a push network comprising copying nodes 2 and distribution network 10, wherein copying nodes 2 are means for copying information held in a packet sent from an information providing terminal 7 and for generating a plurality of packets with this same information, and distribution network 10 is means for distributing packets generated by copying nodes 2 to a plurality of user terminals 8. An information providing terminal 7 is provided with content ID adder 3 which is means for adding to a packet a content identifier for identifying the content of the information held in that packet. Distribution network 10 comprises content filters 1 which are means for deciding, in accordance with these content identifiers, whether or not to distribute a packet to a given user terminal. As shown in FIG. 6, a content filter 1 comprises COI table 13, provided in correspondence with a destination, in which content identifier related information has been registered; and packet header analyzer 11 and pass/discard controller 12 which are means for passing a packet if the content identifier added to that packet matches the content identifier related information registered in COI table 13. Content identifier related information is registered in COI table 13 in accordance with notification from a user, this content identifier related information corresponding to information content desired by that user.

Figure 6:
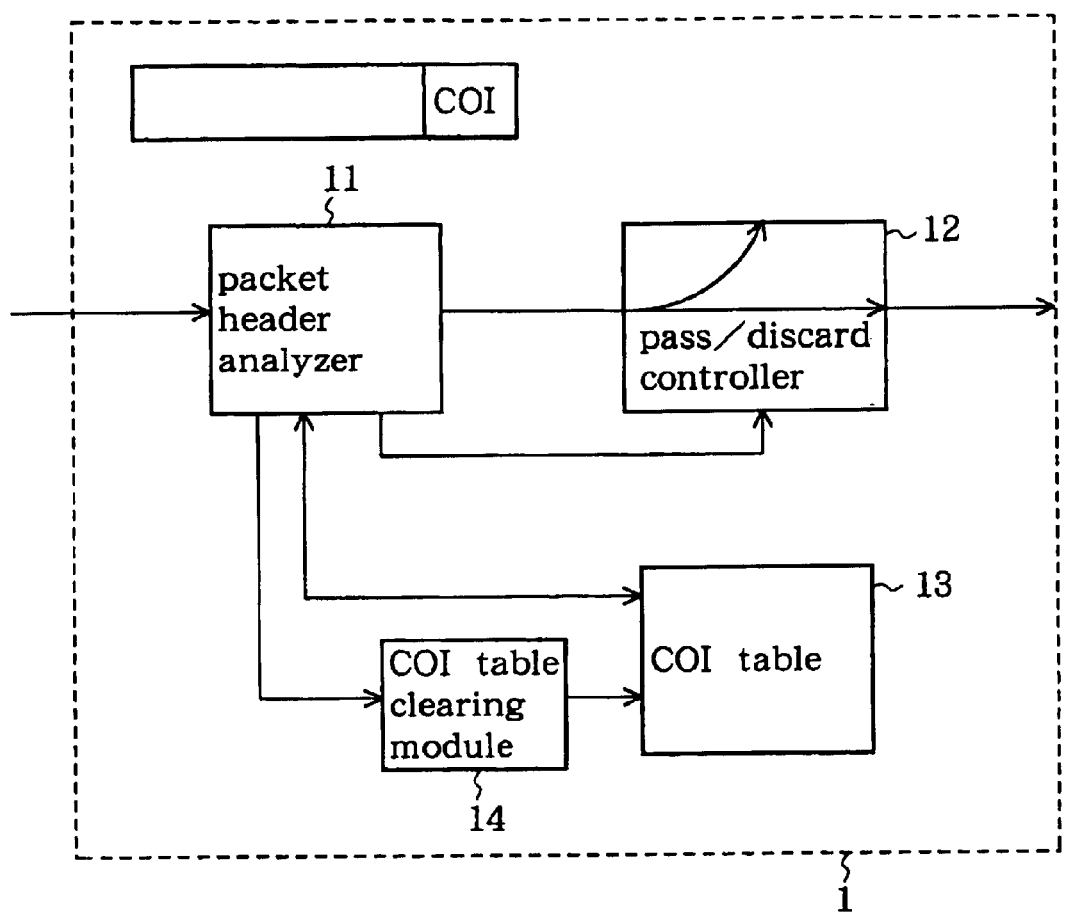
FIG. 6 is a block diagram of the main parts of a content filter according to the second embodiment.

As shown in FIG. 6, a distinguishing feature of this second embodiment of the invention is that it provides COI table clearing module 14 as means for deleting content identifier related information registered in COI table 13, once a series of packets to which the corresponding content identifier has been added have passed.

Figure 7:
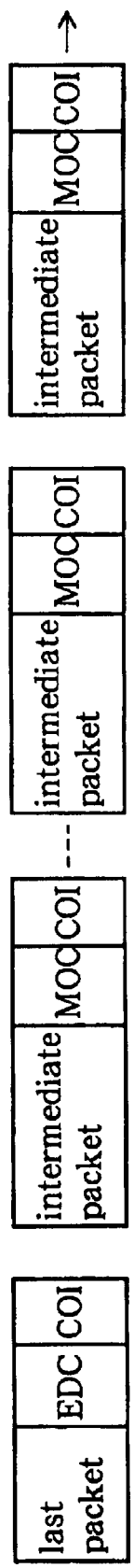
FIG. 7 shows an example of the configuration of a plurality of packets having the same content.
Figure 8:
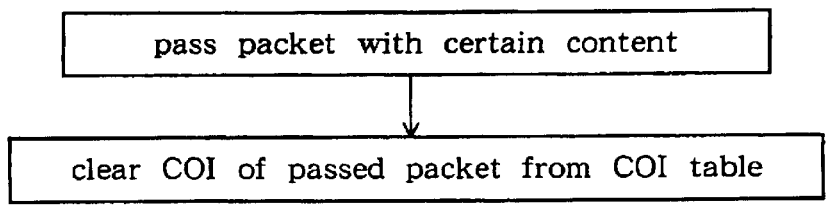
FIG. 8 is a flowchart showing the operation of the second embodiment.
Figure 9:
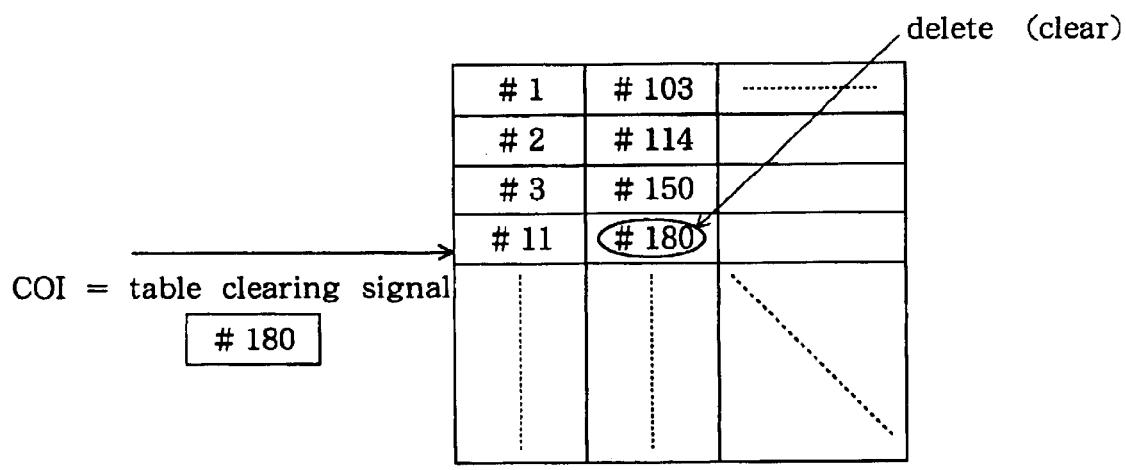
FIG. 9 shows an example of a COI table in the second embodiment.

The operation of the push network according to this second embodiment will be described with reference to FIGS. 5 to 9. FIG. 7 gives an example of the configuration of a plurality of packets having the same content. FIG. 8 is a flowchart of the operation of this second embodiment. FIG. 9 gives an example of a COI table according to this second embodiment.

In this push network, users send to the network content identifiers corresponding to content which the users require, and the content filter 1 in the transit nodes stores these content identifiers in COI table 13. Each content has a unique content identifier, just as for example a television program has a unique Video Plus code. If the content identifier added to a packet that a source has transferred into distribution network 10 is in COI table 13 of a content filter 1, that content filter passes that packet, and if it is not in COI table 13, that packet is discarded. Thus, provided that a source distributes content at regular intervals, packets will continue to be transferred in multicast fashion to users who have made a request in advance.

As shown in FIG. 8, after a packet has passed, the content identifier of the passed packet is deleted from COI table 13 by COI table clearing module 14 shown in FIG. 6.

A packet is sometimes divided as shown in FIG. 7 into a plurality of packets with the same content identifier, and these plurality of packets are then transferred through the distribution network. In such a case, BOC (beginning of content) indicating the leading packet, MOC (middle of content) indicating an intermediate packet, or EOC (end of content) indicating the final packet, are added to these packets. In this case the passing of a series of packets with the same content identifier can be recognized by detecting the passing of the final packet. For example, when a final packet having COI=#180 passes, COI table clearing module 14 sends a COI table clearing signal to the COI table and thereby deletes the registration of COI=#180. This is illustrated in FIG. 9.

By thus deleting from COI table 13 the registration of content identifiers that are no longer needed, effective use can be made of the memory resources of the table.

Third embodiment

Figure 10:
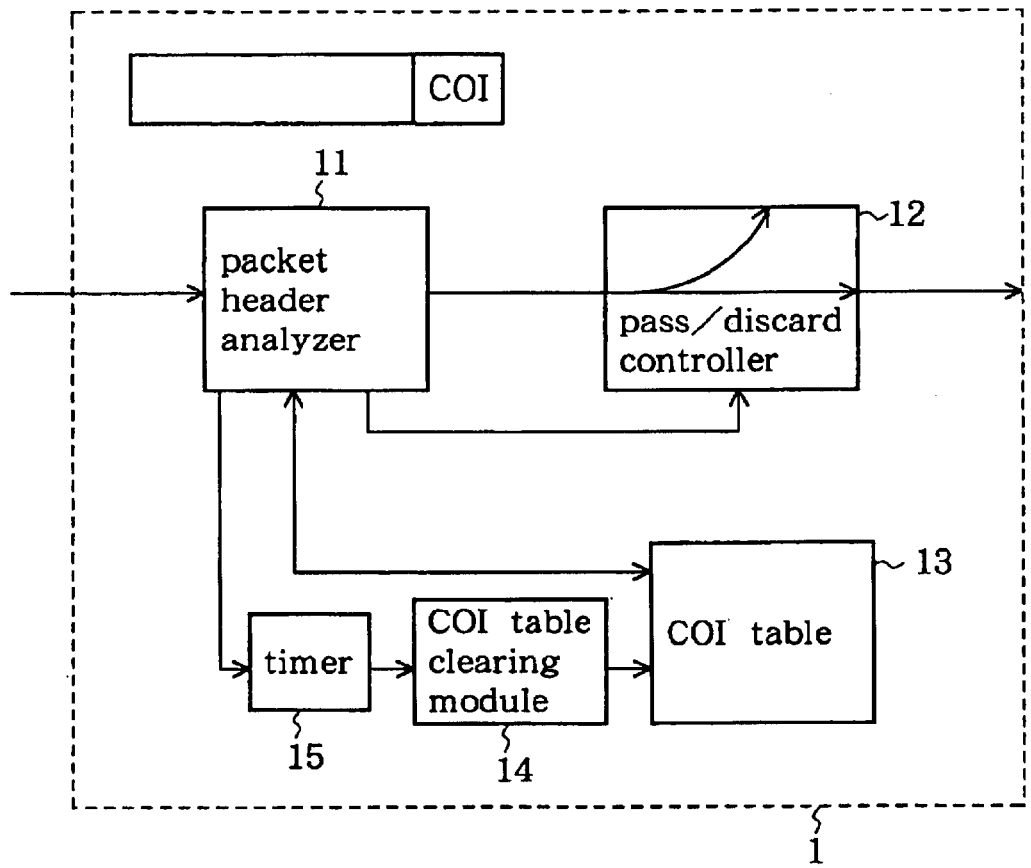
FIG. 10 is a block diagram of the main parts of a content filter according to a third embodiment of this invention.

The configuration of a content filter according to a third embodiment of this invention will be described with reference to FIG. 10, which is a block diagram of the main parts of this content filter. As shown in FIG. 10, a distinguishing feature of content filter 1 according to this third embodiment is that COI table clearing module 14 has timer 15 as means for deleting content identifier related information after a prescribed time interval has elapsed after a series of packets have passed.

Figure 11:
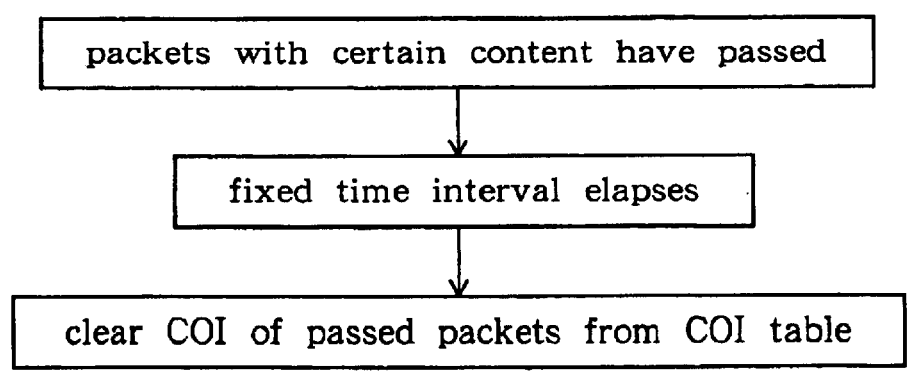
FIG. 11 is a flowchart showing the operation of a content filter in the third embodiment.

The operation of a content filter according to this third embodiment will now be described with reference to FIG. 11, which is a flowchart of this operation. In the second embodiment, the operation of clearing an item from COI table 13 began immediately after packets had passed. As opposed to this, in this third embodiment, as shown in FIG. 11, COI table clearing module 14 begins to clear an item from COI table 13 after a fixed time interval has elapsed after packets have passed, this time interval being determined by timer 15 shown in FIG. 10.

Consequently, if, after packets have passed, a packet having the same content identifier arrives, that packet is also allowed to pass, provided that the fixed time interval is not exceeded.

A content filter according to this third embodiment could be used in two different ways. In the first manner of use, if a packet having a content identifier registered in advance by a user passes, then this content identifier is deleted from COI table 13 after a fixed time interval which would usually range from several hours to several days. In the second manner of use, by setting the timer 15 preset to an extremely long time such as several weeks or several months, content regarding which the information provider is no longer providing information could be identified and the corresponding content identifier deleted.

In this second manner of use, if an information provider wishes to avoid content identifier related information being deleted from COI table 13, this can be achieved by transmitting at regular intervals a dummy packet to which the content identifier in question has been added.

Fourth embodiment

Figure 12:
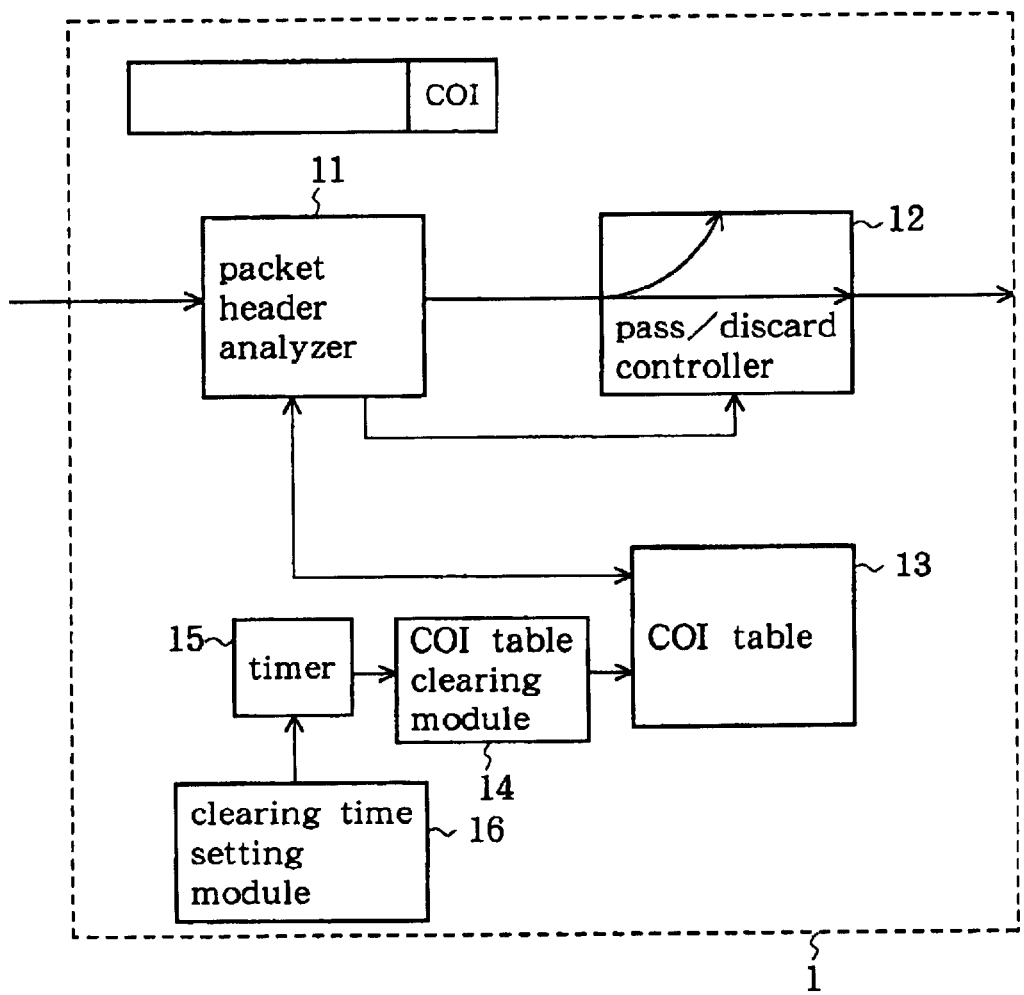
FIG. 12 is a block diagram of the main parts of a content filter according to a fourth embodiment of this invention.

The configuration of a content filter according to a fourth embodiment of this invention will be described with reference to FIG. 12, which is a block diagram of the main parts of this content filter. As shown in FIG. 12, a distinguishing feature of content filter 1 according to this fourth embodiment is that it has clearing time setting module 16 as means for deleting, at a predetermined time, content identifier related information that has been registered in COI table 13.

Figure 13:
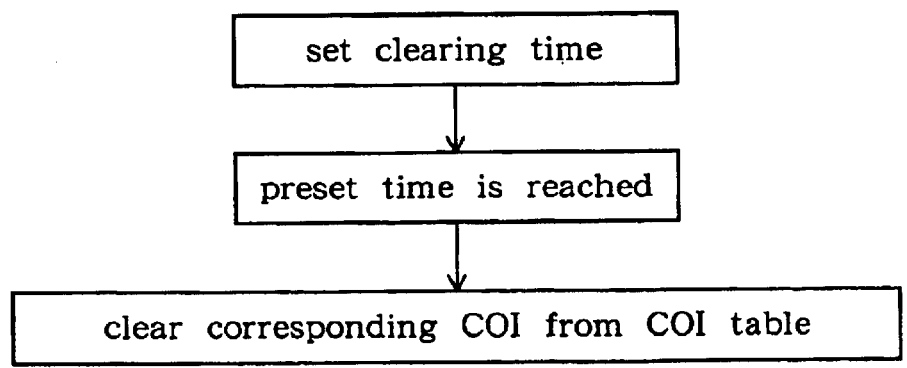
FIG. 13 is a flowchart showing the operation of a content filter in the fourth embodiment.

The operation of a content filter according to this fourth embodiment will now be described with reference to FIG. 13, which is a flowchart of this operation. In the second embodiment, the operation of clearing an item from COI table 13 began immediately after packets had passed. As opposed to this, in this fourth embodiment, as shown in FIG. 13, the time at which an item is cleared from COI table 13 is set in advance for each content in clearing time setting module 16 shown in FIG. 12. When a preset time is reached, COI table clearing module 14 clears the corresponding content identifier from COI table 13.

For content such as news which is valuable information for only a relatively short period and decreases in value once a certain time has passed, this arrangement serves to decide that a content identifier registered in COI table 13 is no longer required, whereupon that content identifier is cleared.

Fifth embodiment

Figure 14:
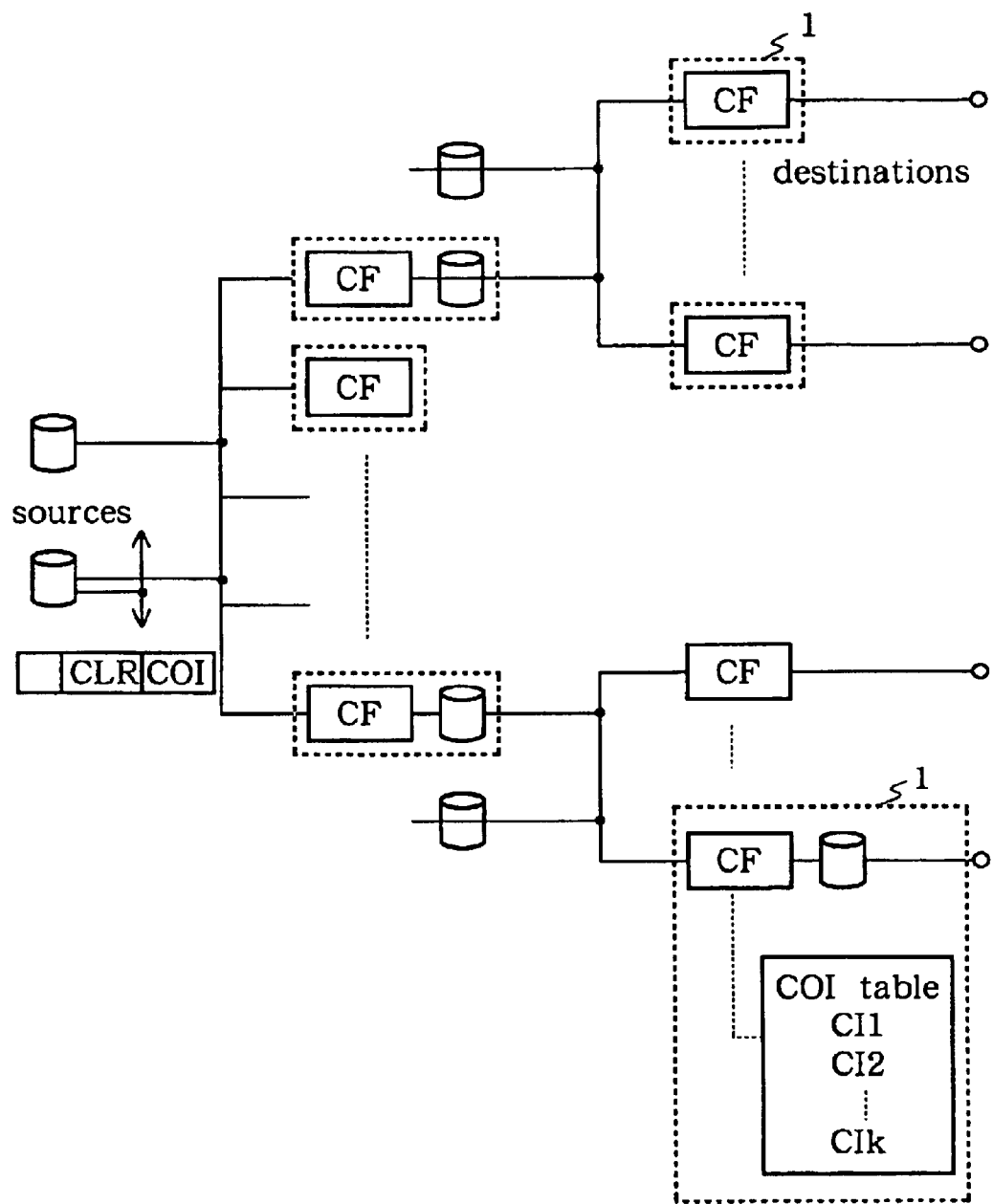
FIG. 14 shows the configuration of a push network according to a fifth embodiment of this invention.
Figure 15:
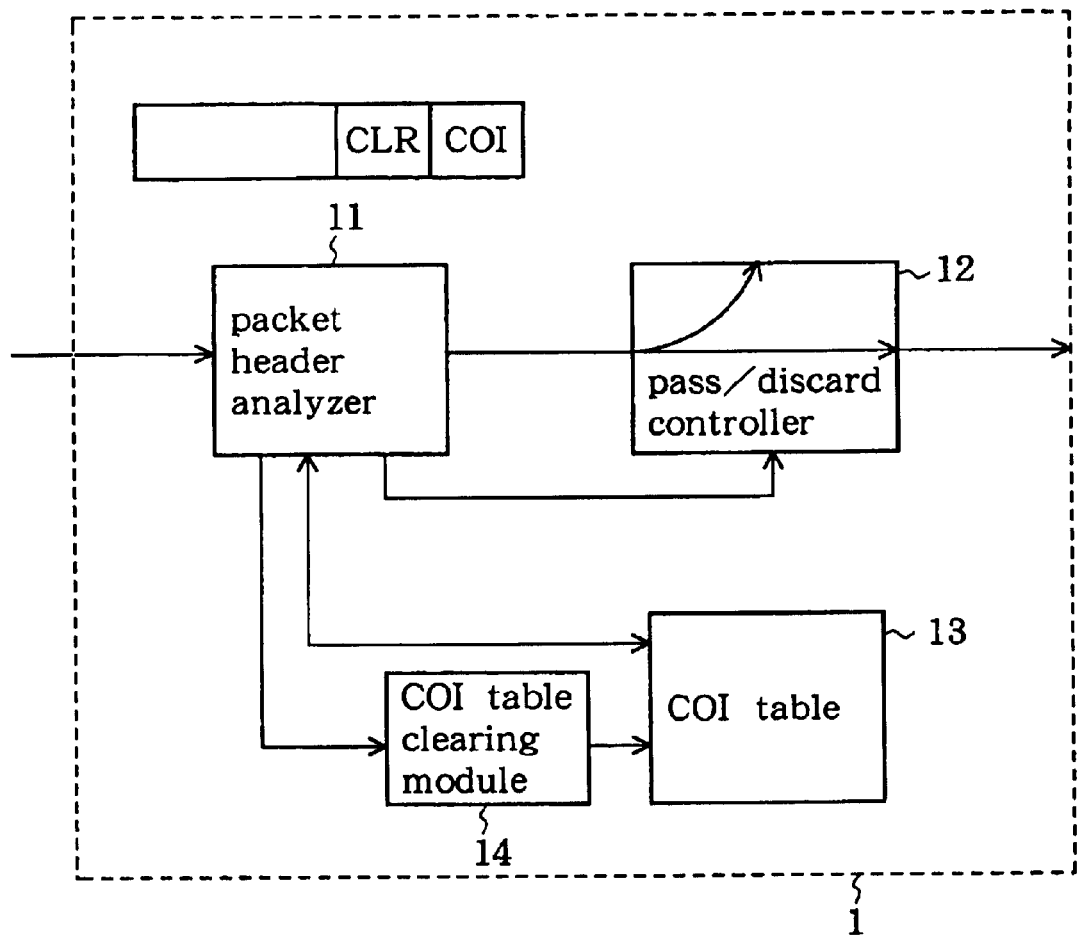
FIG. 15 is a block diagram of the main parts of a content filter in the fifth embodiment.

The configuration of a content filter according to a fifth embodiment of this invention will be described with reference to FIGS. 14 and 15. As illustrations of this fifth embodiment, FIG. 14 gives an example of the configuration of a push network and FIG. 15 is a block diagram of the main parts of a content filter. As shown in FIG. 15, a distinguishing feature of content filter 1 according to this fifth embodiment is that it has COI table clearing module 14 as means for receiving a COI table clearing packet requesting deletion of a content identifier, said packet being transmitted from an information providing terminal 7, and for deleting the content identifier in question.

Figure 16:
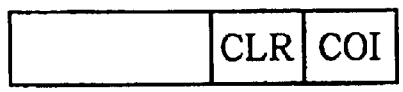
FIG. 16 shows the configuration of a COI table clearing packet in the fifth embodiment.
Figure 17:
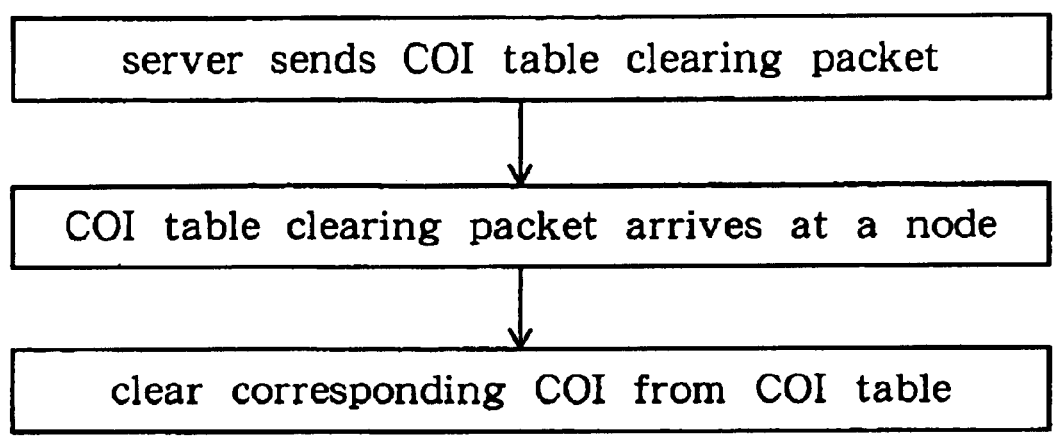
FIG. 17 is a flowchart showing the operation of a content filter in the fifth embodiment.

Next, the operation of a content filter according to this fifth embodiment will be described with reference to FIGS. 16 and 17, whereof FIG. 16 shows the configuration of a COI table clearing packet and FIG. 17 is a flowchart of the content filter operation. In this fifth embodiment, as shown in FIG. 17, if an item is to be cleared from COI table 13, a server shown in FIG. 14 (i.e. a source) sends a COI table clearing packet into the distribution network. As shown in FIG. 16, a COI table clearing packet comprises a clearing packet identifier (CLR) added to an ordinary content transferring packet, and is interpreted as being a COI table clearing packet by the presence of this identifier.

A COI table clearing packet is transferred through distribution network in the same manner as an ordinary packet, and is filtered by COI tables 13. In other words, it is either passed or discarded by a content filter. If packet header analyzer 11 shown in FIG. 15 detects a COI table clearing packet as shown in FIG. 16, COI table clearing module 14 shown in FIG. 15 clears the corresponding content identifier from COI table 13.

Sixth embodiment

Figure 18:
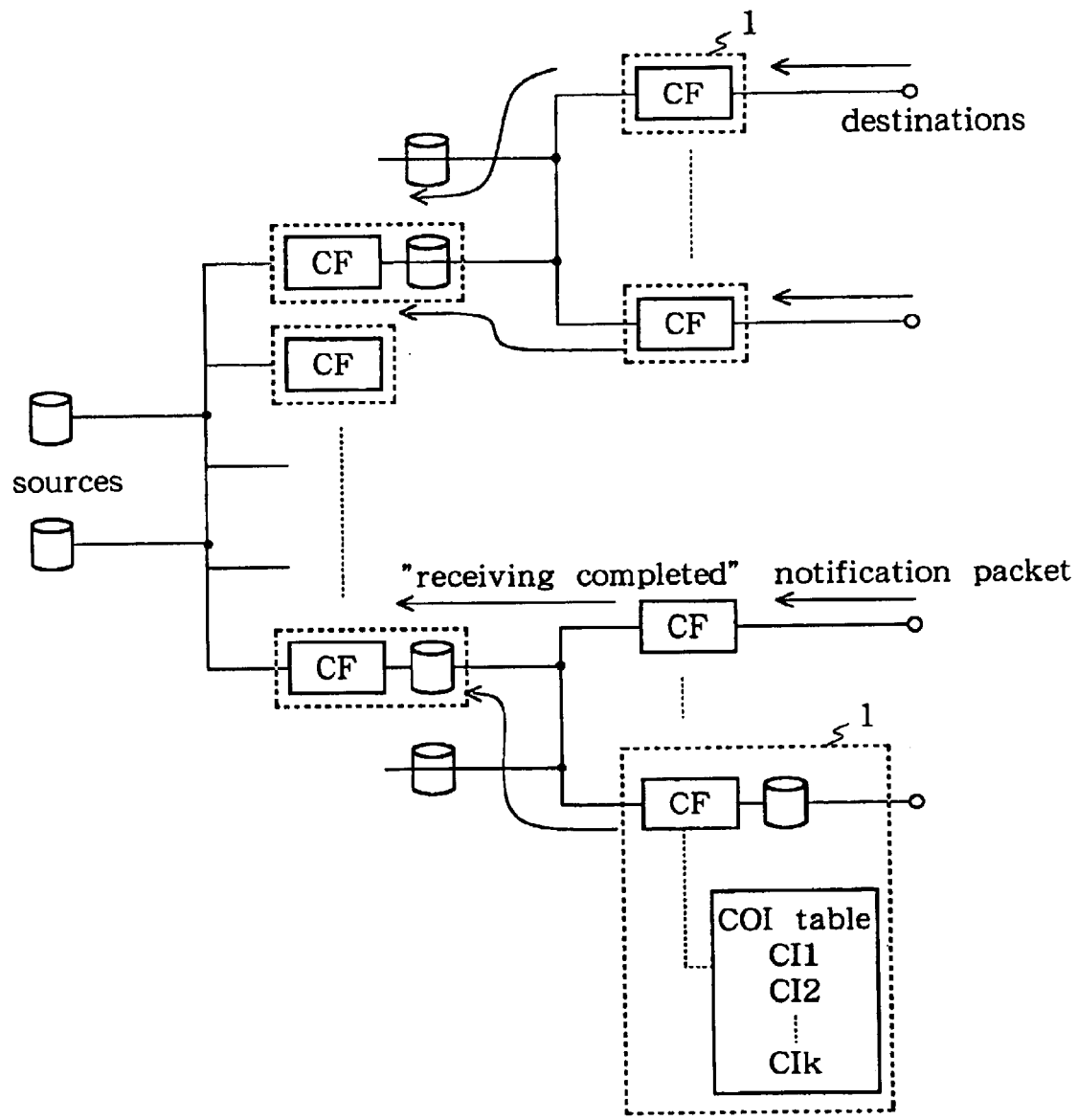
FIG. 18 shows the configuration of a push network according to a sixth embodiment of this invention.
Figure 19:
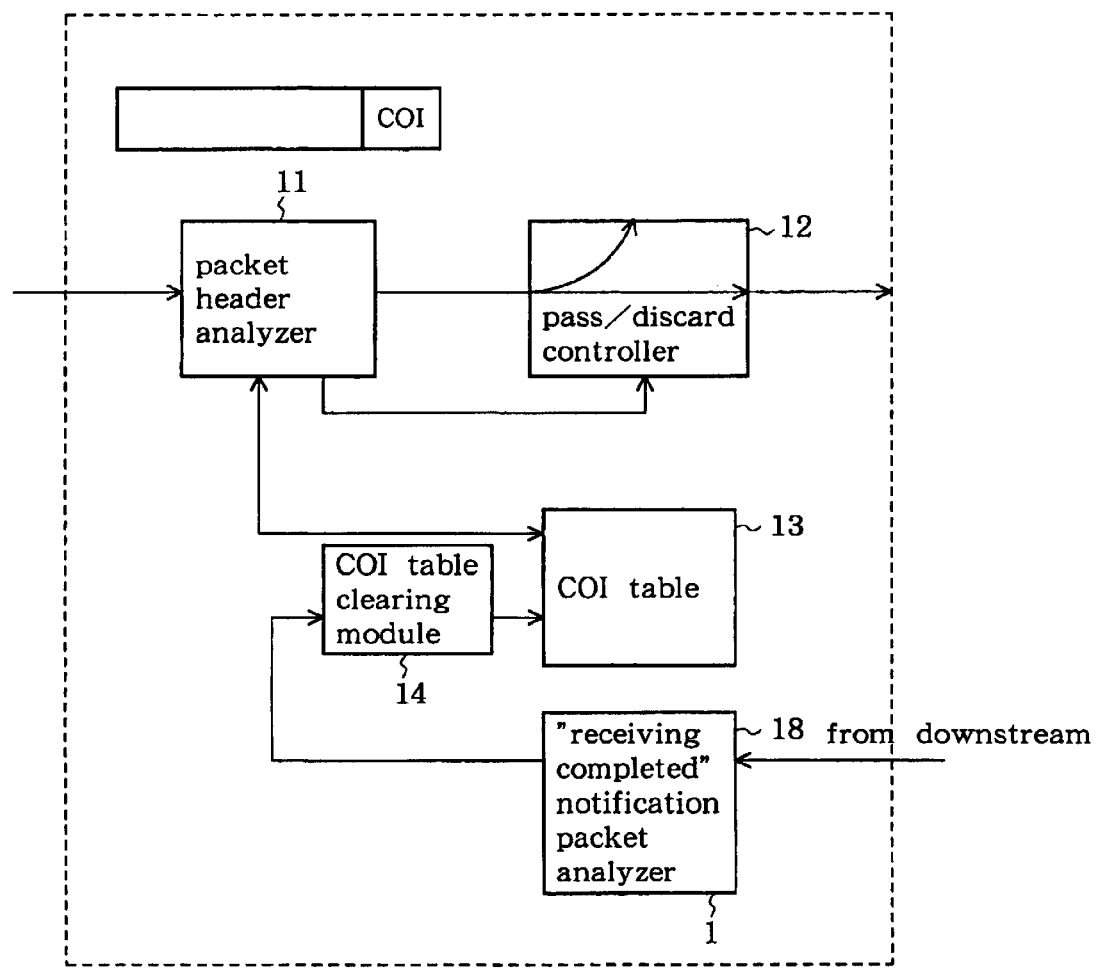
FIG. 19 is a block diagram of the main parts of a content filter in the sixth embodiment.

The configuration of a content filter according to a sixth embodiment of this invention will be described with reference to FIGS. 18 and 19. As illustrations of this sixth embodiment, FIG. 18 gives an example of the configuration of a push network and FIG. 19 is a block diagram of the main parts of a content filter. As shown in FIG. 19, a distinguishing feature of content filter 1 according to this sixth embodiment is that it comprises "receiving completed" notification packet analyzer 18 as means for deleting a content identifier when it receives a packet giving notification that receiving is completed, said packet having been sent from a node or user that has received packets to which that content identifier has been added.

Figure 20:
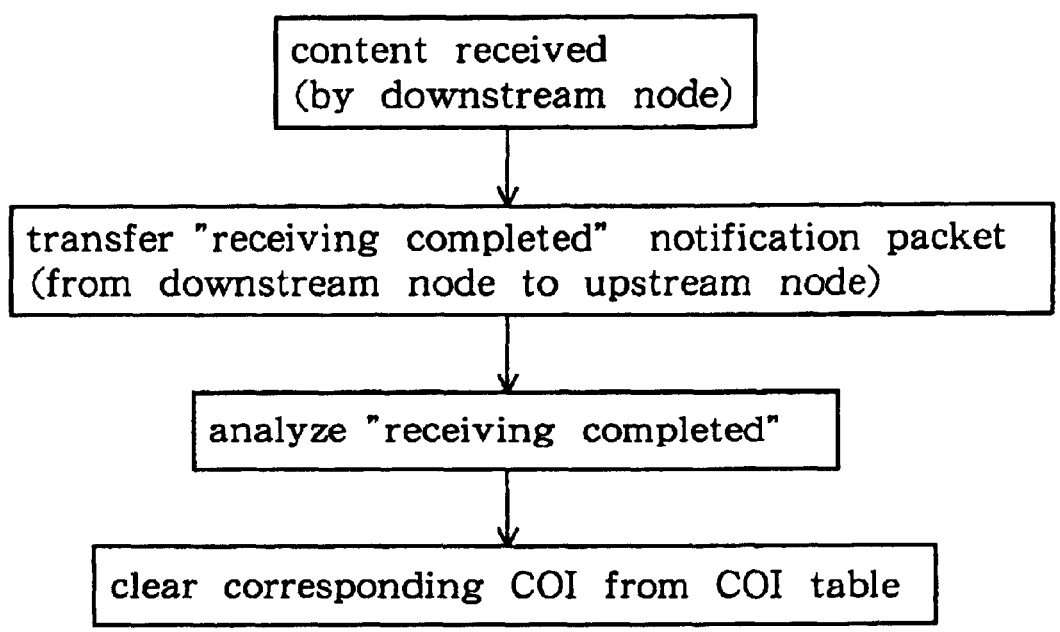
FIG. 20 is a flowchart showing the operation of a content filter in the sixth embodiment.

Next, the operation of a content filter according to this sixth embodiment will be described with reference to FIG. 20, which is a flowchart of this operation. As shown in FIG. 20, when a node or user downstream of a node that has passed a given content receives that content, a content filter according to this sixth embodiment sends a "receiving completed" notification packet to the upstream node, said packet giving notification that receiving has been completed. The upstream node then receives this "receiving completed" notification packet.

If "receiving completed" notification packet analyzer 18 shown in FIG. 19 detects the arrival of this packet from all or some of the nodes constituting the downstream leaf, it decides that receiving by downstream nodes has been completed, whereupon COI table clearing module 14 clears the corresponding content identifier from COI table 13.

Seventh embodiment

Figure 21:
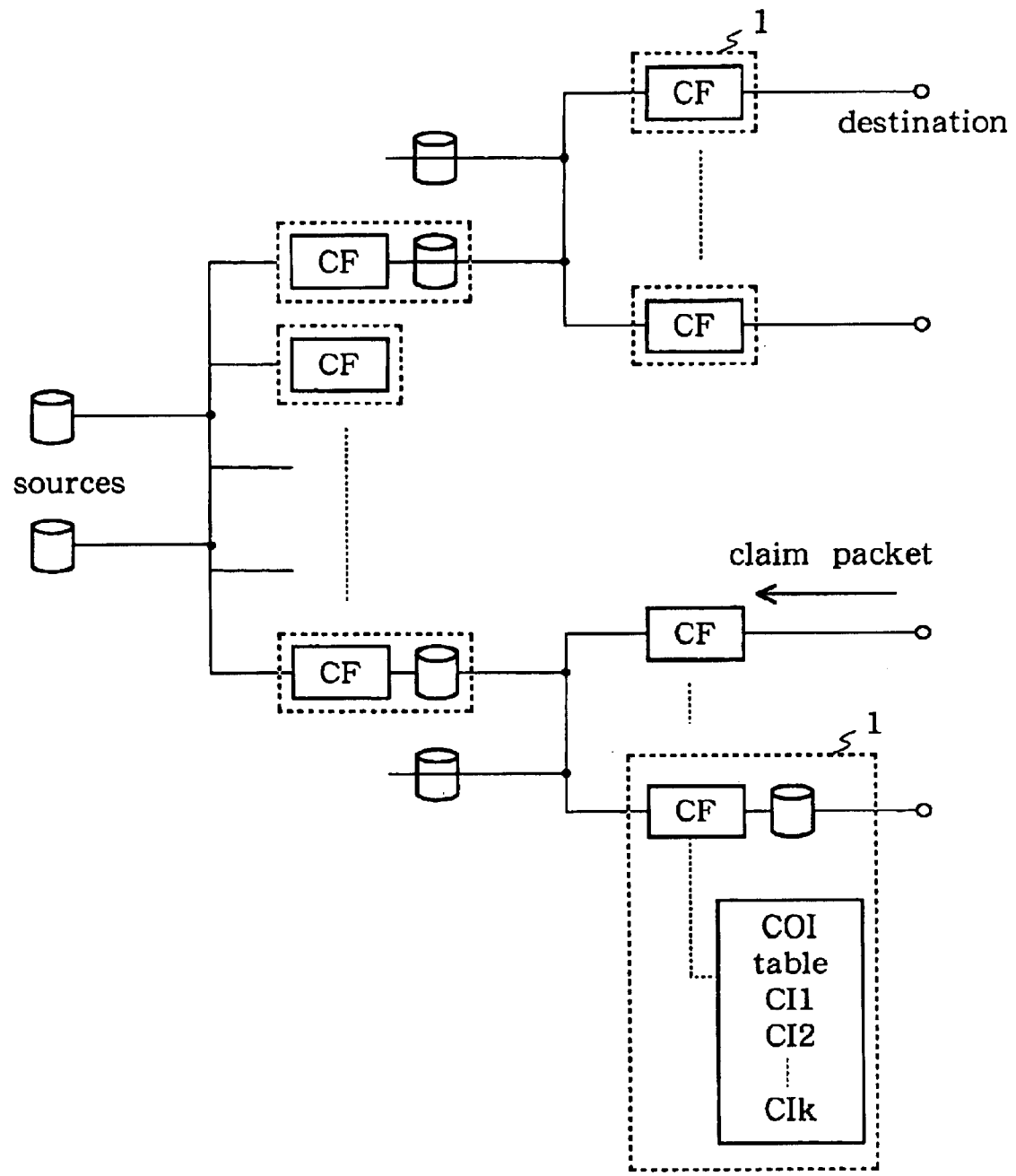
FIG. 21 shows the configuration of a push network according to a seventh embodiment of this invention.
Figure 22:
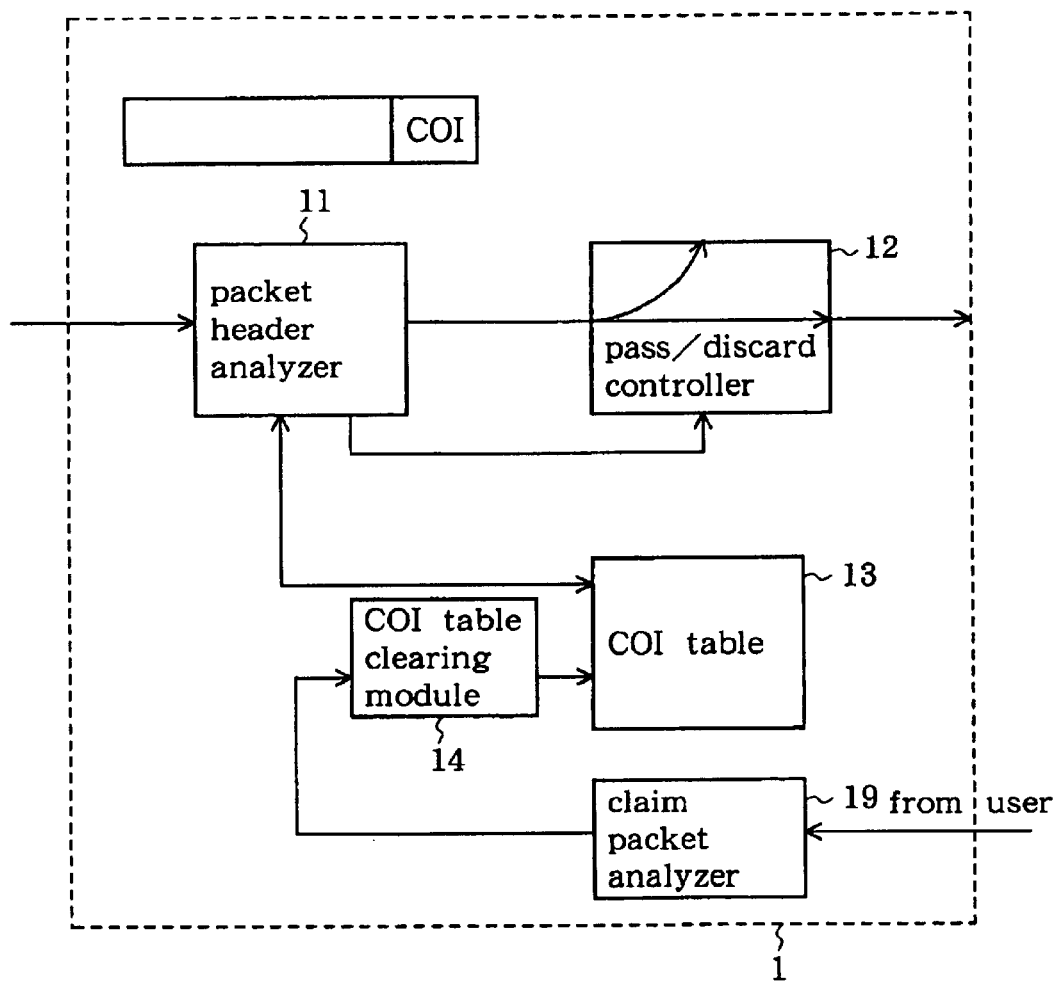
FIG. 22 is a block diagram of the main parts of a content filter in the seventh embodiment.

The configuration of a content filter according to a seventh embodiment of this invention will be described with reference to FIGS. 21 and 22. As illustrations of this seventh embodiment, FIG. 21 gives an example of the configuration of a push network and FIG. 22 is a block diagram of the main parts of a content filter. As shown in FIG. 22, a distinguishing feature of a content filter 1 according to this seventh embodiment is that it comprises claim packet analyzer 19, which is means for receiving a claim packet requesting deletion of a content identifier, said claim packet being transmitted from a user terminal 8, and for deleting the content identifier in question.

Figure 23:
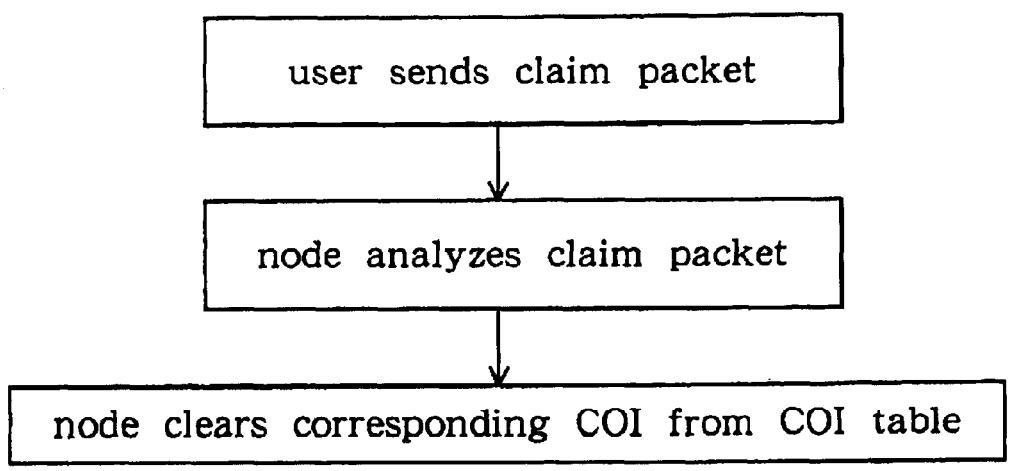
FIG. 23 is a flowchart showing the operation of a content filter in the seventh embodiment.

Next, the operation of a content filter according to this seventh embodiment will be described with reference to FIG. 23, which is a flowchart of this operation. As shown in FIG. 23, in this seventh embodiment of the invention, to clear a content identifier from a COI table 13, a user (i.e. a destination) sends into the distribution network a claim packet relating to a content identifier corresponding to content that the user does not wish to receive. As shown in FIG. 21, the route taken by the claim packet is the reverse of the route along which a packet is transferred from a server to that user. This routing information can be communicated to a user by for example adding to a packet, as it heads towards a user, information relating to the route passed. A node that has detected, by means of claim packet analyzer 19 shown in FIG. 22, that it has received a claim packet, clears the corresponding content identifier from COI table 13 by means of COI table clearing module 14, provided that this affects only those users downstream of the node in question who have sent a claim packet.

Eighth embodiment

Figure 26:
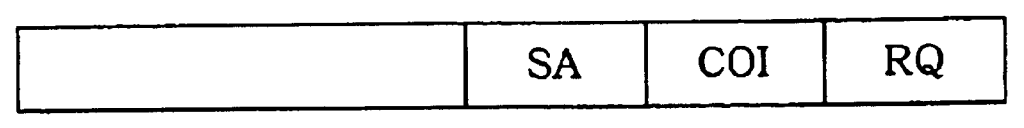

The configuration of a push network according to an eighth embodiment of this invention will be described with reference to FIGS. 5, 2, 3, 24, 25 and 26. Although FIG. 5 is a block diagram of the main parts of a push network according to the second embodiment, it applies to the eighth embodiment as well. FIG. 2 shows the configuration of a packet used in the first embodiment, but also illustrates the configuration of a packet used in the eighth embodiment. FIG. 3 is a block diagram of the main parts of a content filter according to the first embodiment, but applies to the eighth embodiment as well. As illustrations of this eighth embodiment, FIG. 24 shows the configuration of a push network, FIG. 25 is a block diagram of the main parts of a content filter setting system, and FIG. 26 shows the configuration of a request packet.

As shown in FIG. 5, in this eighth embodiment the invention is a push network comprising copying nodes 2 and distribution network 10, wherein copying nodes 2 are means for copying information held in a packet sent from an information providing terminal 7 and for generating a plurality of packets with this same information, and distribution network 10 is means for distributing packets generated by copying nodes 2 to a plurality of user terminals 8. Information providing terminals 7 are each provided with content ID adder 3 which is means for adding to a packet a content identifier for identifying the content of the information held in that packet. Distribution network 10 comprises content filters 1 which are means for deciding, in accordance with these content identifiers, whether or not to distribute a packet to a given user terminal 8. As shown in FIG. 3, a content filter 1 includes table 4, provided in correspondence with a destination, in which content identifier related information has been registered; and also includes pass/discard controller 6 which is means for passing a packet if the content identifier added to that packet matches the content identifier related information registered in table 4. As shown in FIG. 24, a push network according to this eighth embodiment of the invention has content filter setting system 20, which is means for registering content identifier related information in table 4 of content filters 1, in accordance with notification from users. As shown in FIG. 25, this content filter setting system 20 comprises content ID analyzer 21, which is means for receiving a request packet in which a content identifier notified by a user has been written, and content filter setting module 23, which is means for registering content identifier related information in table 4 in accordance with the content identifier written in the request packet received by content ID analyzer 21.

Next, the operation of a push network according to this eighth embodiment will be described. A user sends to distribution network 10 a content identifier indicative of the information content required by the user, and content filter 1 in each transit node shown in FIG. 5 stores this content identifier (COI) in table 4 shown in FIG. 3. Each content has a unique content identifier, just as a television program has a unique Video Plus code. If the content identifier written in a packet that has been transferred into distribution network 10 from an information providing terminal 7 is in table 4 of a content filter 1, the packet is passed by that content filter, but if the content identifier is not in table 4 the packet is discarded. Thus, provided that an information providing terminal distributes content at regular intervals, packets will continue to be transferred in multicast fashion to users who have made a request in advance.

Figure 24:
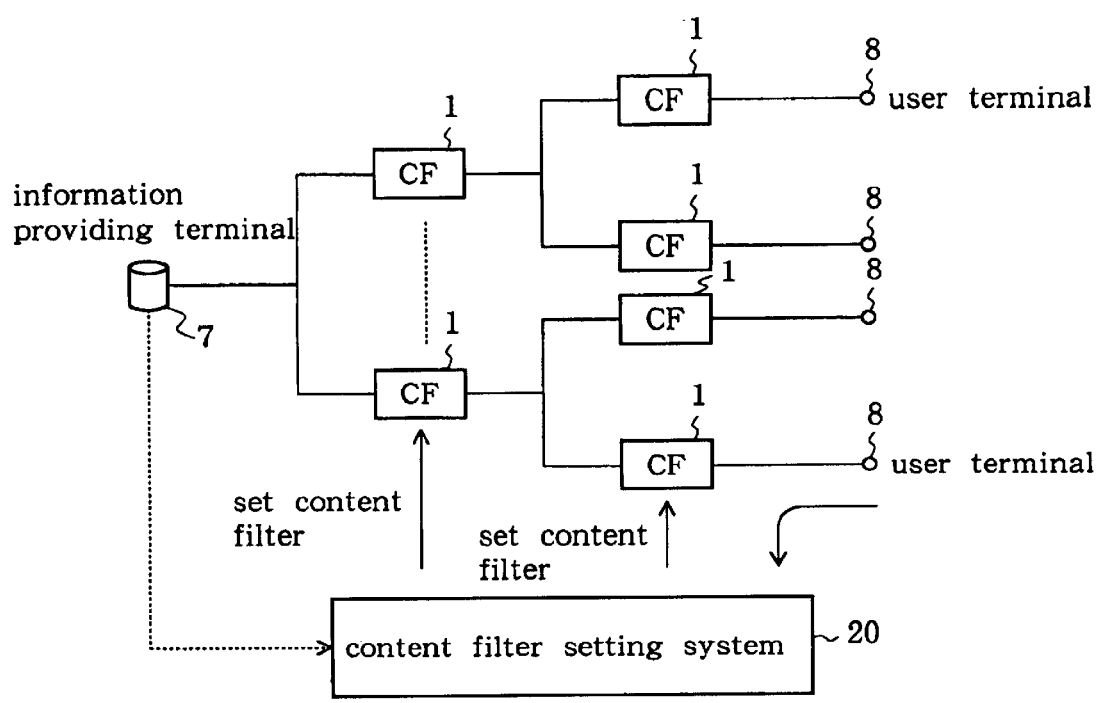
FIG. 24 shows the configuration of a push network according to an eighth embodiment of this invention.
Figure 25:
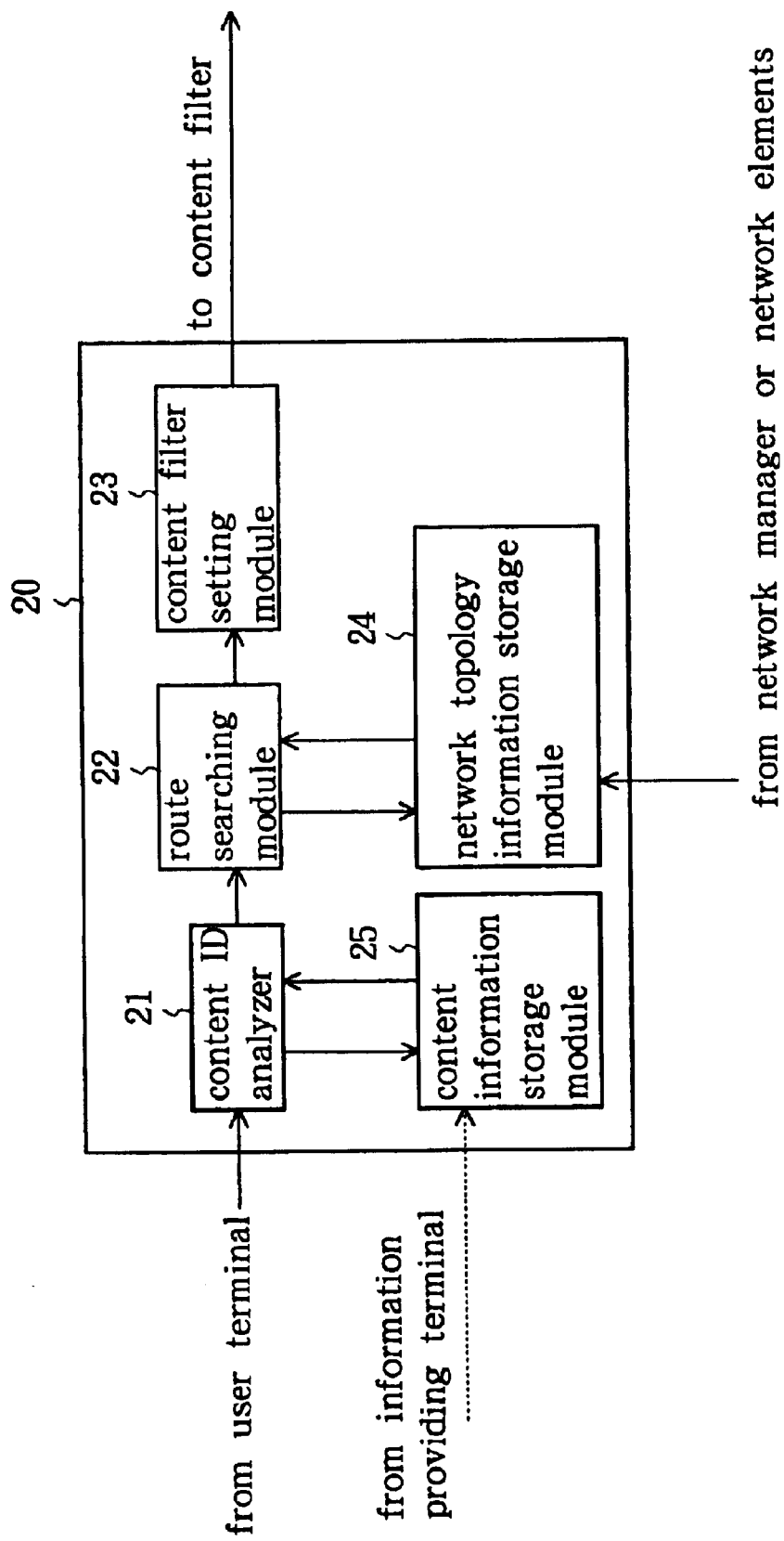
FIG. 25 is a block diagram of the main parts of a content filter setting system in the eighth embodiment.

As shown in FIG. 24, in this eighth embodiment of the invention, content filter setting system 20 is provided at the information providing terminal side of the distribution network so that users can set content filters 1. Content filter setting system 20 manages the content filters within the distribution network in centralized fashion.

In order for a user to receive a packet with particular content, content filter 1 of each node must be set so that a packet with that content will pass from information providing terminal 7 to user terminal 8.

First of all, the user sends the distribution network a request packet requesting reception of a particular content. As shown in FIG. 26, the request packet has a request packet identifier RQ for identifying it as a request packet, a content identifier COI, and a source address SA giving the address of an information providing terminal 7.

Request identifier RQ and content identifier COI are set by a user. Source address SA can be set by a user or by a network manager. For example, if a user specifies a particular server as the information providing terminal constituting the source of the content, then the user sets the source address SA. If the user does not specify a particular server as the source of the content, the source address SA is set by the network manager.

A request packet that has been sent into distribution network 10 by a user is transferred to content filter setting system 20 by way of the nodes. As shown in FIG. 25, in content filter setting system 20 the content identifier (COI) of the request packet is analyzed by content ID analyzer 21. If no source address SA has been set in the request packet, content information storage module 25 searches for the address of a suitable server to supply that content. Content information storage module 25 then updates its information regarding which server is supplying that content. Route searching module 22 searches for a route between the user and the server constituting the source, on the basis of information from network topology information storage module 24. Of the searched routes, the route selected is for example the shortest route or the route with the smallest number of hops. The topology information in network topology information storage module 24 is updated by the network manager or by network elements.

Content filter setting module 23 sets content filters 1 in the nodes on the route from the server to the user so that the content in question, which has been supplied from the server, can pass through these filters.

By setting content filters 1 in this manner, a push network can be implemented which efficiently transfers push service traffic sent at regular intervals, without the server constituting the source having to copy content to as many packets as there are users, which is required in a conventional push service network.

Ninth embodiment

Figure 27:
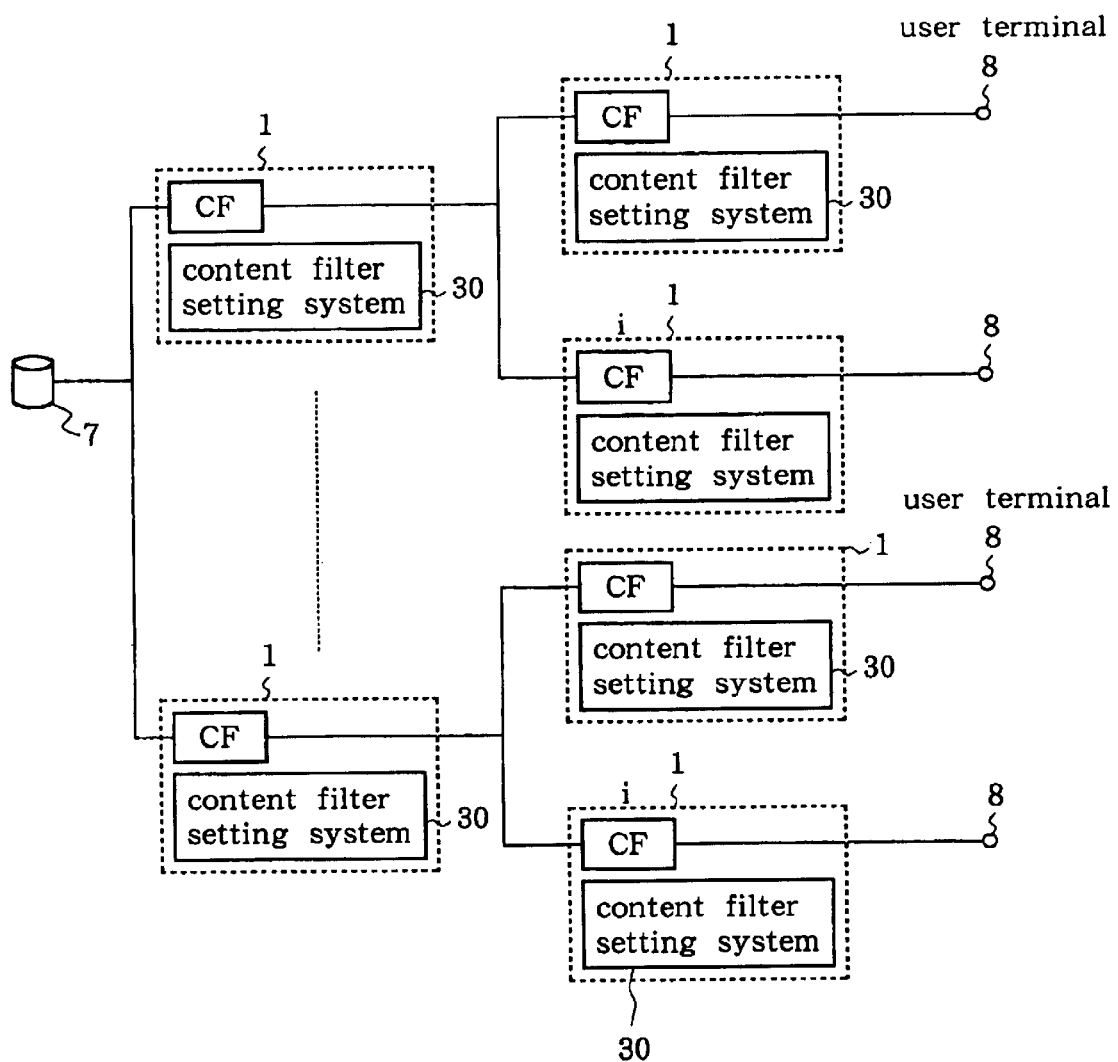
FIG. 27 serves to explain the setting of content filters according to a ninth embodiment of this invention.
Figure 28:
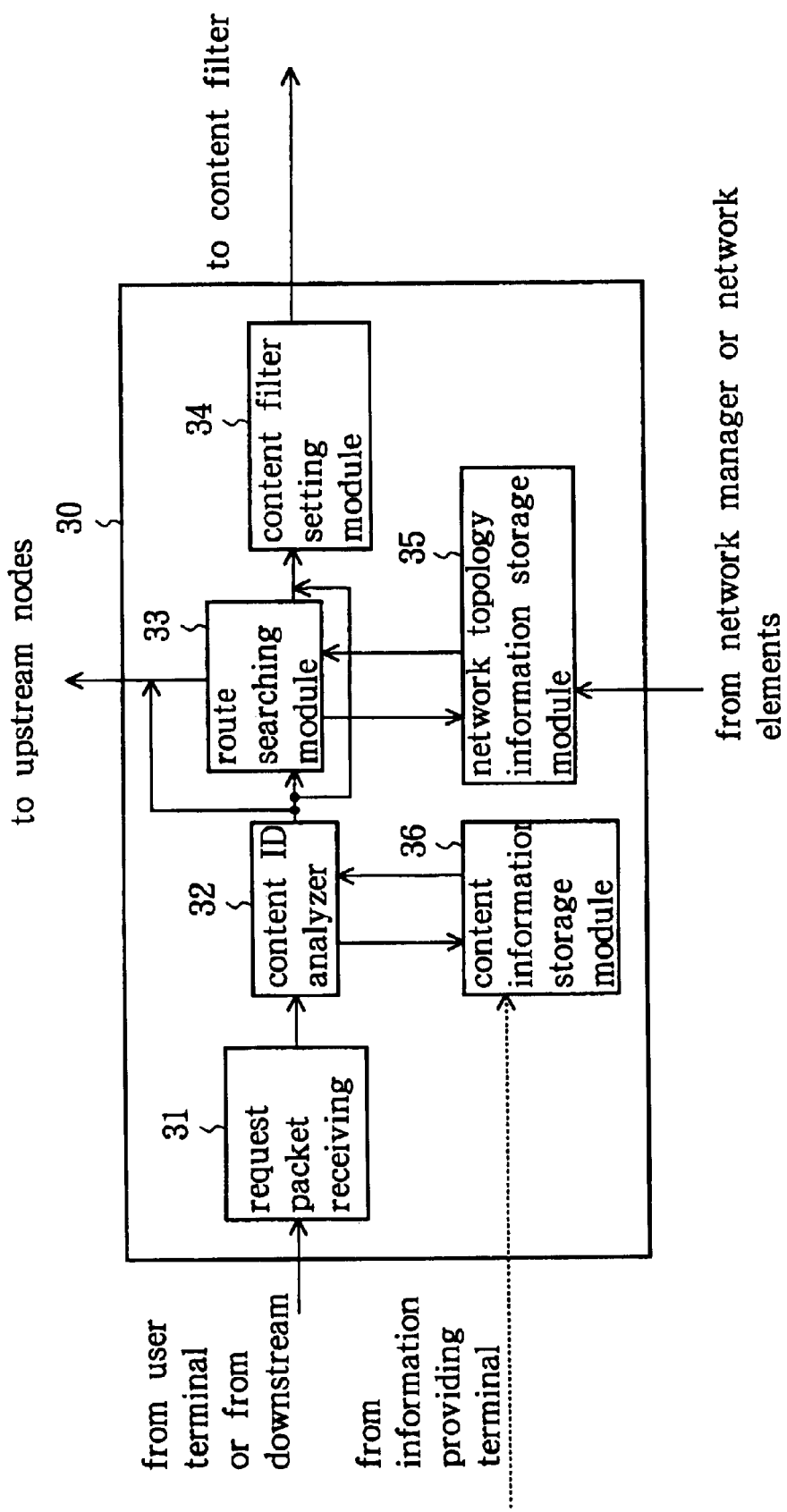
FIG. 28 is a block diagram of the main parts of a content filter setting system in the ninth embodiment.
Figure 29:
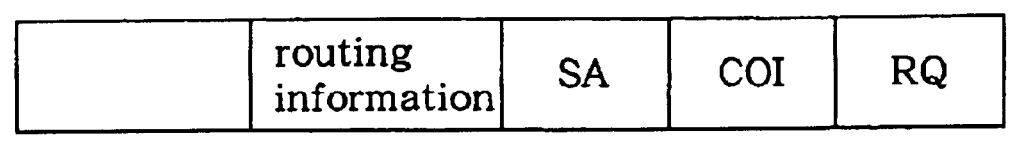

A push network according to a ninth embodiment of this invention will be described with reference to FIGS. 27 to 29. As illustrations of this ninth embodiment, FIG. 27 serves to explain the setting of content filters, FIG. 28 is a block diagram of the main parts of a content filter setting system, and FIG. 29 serves to explain a request packet. In this ninth embodiment, a content filter setting system 30 is provided in each node. The first node to receive a request packet from a user uses route searching module 33 shown in FIG. 28 to search for a route. When it finds a route, it writes the routing information—i.e., the information relating to a route from the user or the local node to the server—in the request packet, which is illustrated in FIG. 29. The request packet is then transferred to upstream nodes in the direction of the server. Content filter setting module 34 then sets content filter 1 of the local node.

When a node receives a request packet transferred from a downstream node, if there is routing information in that request packet, content filter setting system 30 transfers the request packet to an upstream node in the direction of the server without searching for a route, and content filter setting module 34 sets content filter 1 of the local node.

In this way, the request packet is transferred upstream along a route between a server and a user, and successive content filters are set.

Because this ninth embodiment of the invention provides content filter setting systems 30 in distributed fashion, improved processing performance is achieved.

Tenth embodiment

A push network according to a tenth embodiment of this invention will be described with reference to FIG. 30, which is a block diagram of the main parts of a content filter setting system according to this embodiment. In the ninth embodiment, a node which received a request packet from a user searched for a route, and further upstream nodes transferred the request packet on the basis of the routing information obtained.

As opposed to this, in this tenth embodiment, each node searches for a route from itself to the server. If a route found by a certain node is different from the route obtained by a downstream node, the routing information written in the request packet is rewritten. This ensures that if the optimum route is not selected by a downstream node, the route can be modified by an upstream node. For example, if a fault occurs in a route selected by a downstream node and a request packet has not yet reached the server when the fault occurs, it can be transferred in accordance with routing information updated by an upstream node, thereby enabling the packet to avoid the location where the fault has occurred.

Figure 30:
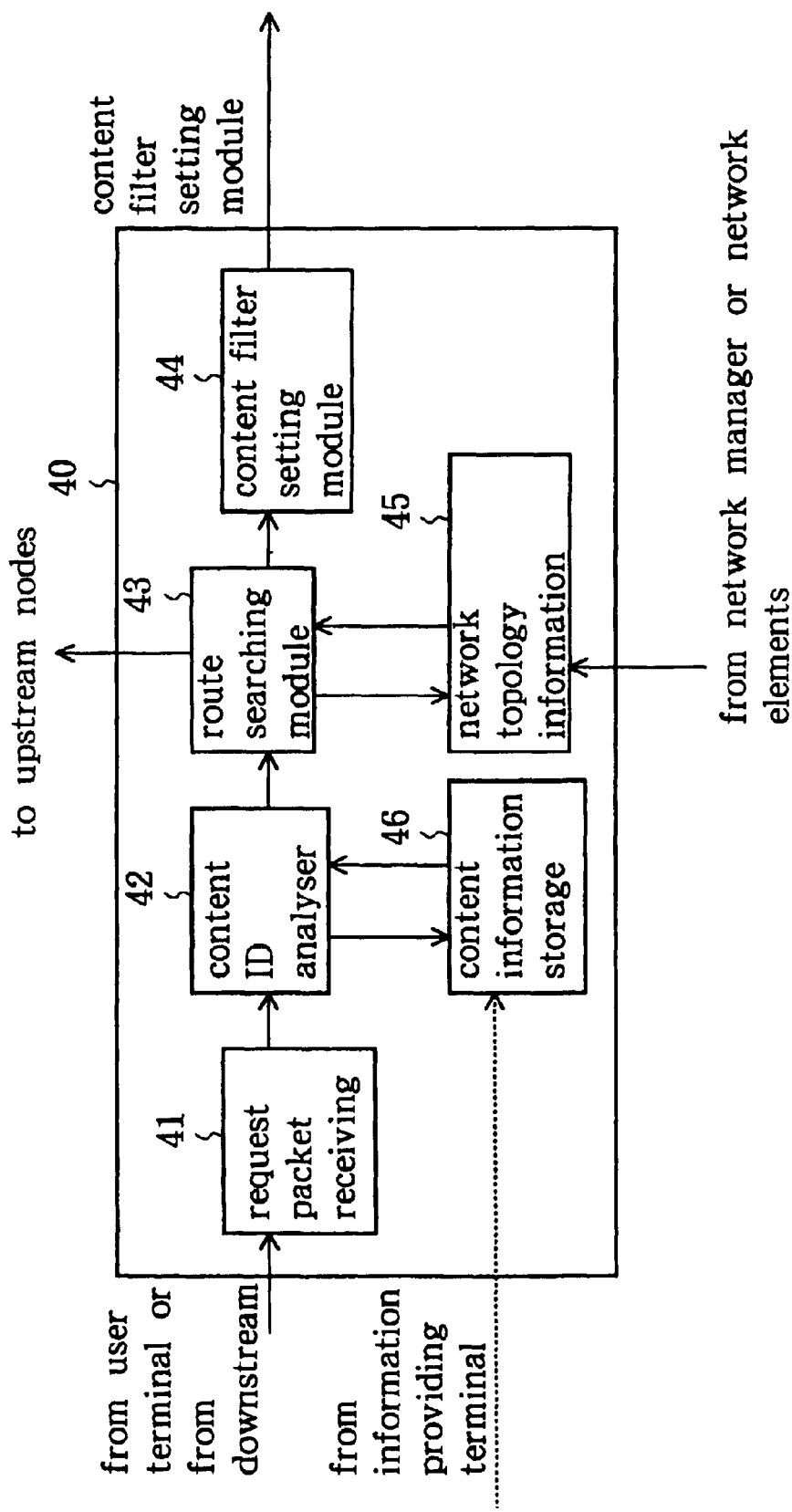
FIG. 30 is a block diagram of the main parts of a content filter setting system according to a tenth embodiment of this invention.

In other words, in content filter setting system 30 of the ninth embodiment, shown in FIG. 28, some packets detour around route searching module 33, whereas in content filter setting system 40 according to this tenth embodiment, shown in FIG. 30, all packets without exception pass through route searching module 43.

Eleventh embodiment

Figure 31:
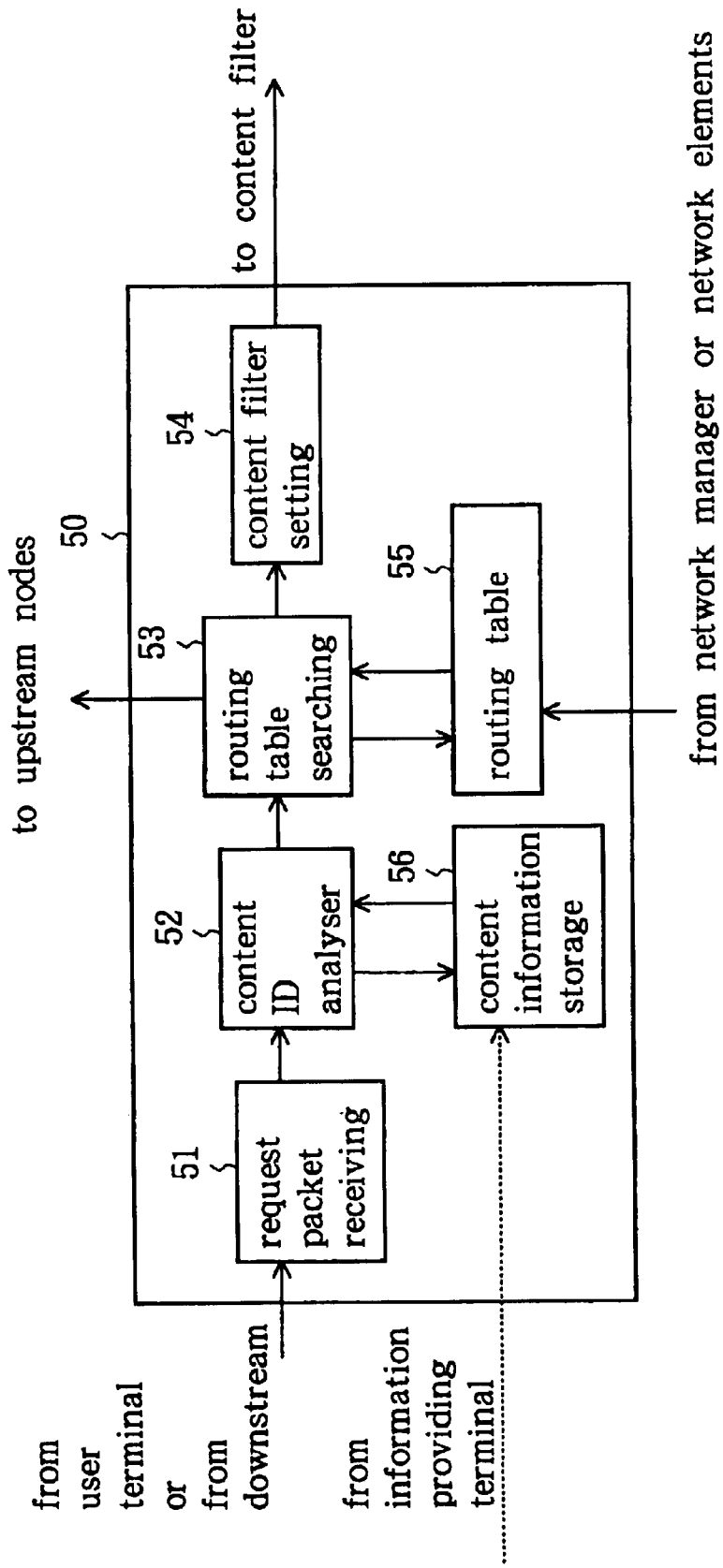
FIG. 31 is a block diagram of the main parts of a content filter setting system according to an eleventh embodiment of this invention.

A push network according to an eleventh embodiment of this invention will be described with reference to FIG. 31, which is a block diagram of the main parts of a content filter setting system according to this eleventh embodiment. In the ninth and tenth embodiments, the search for a route from server to node was performed on the basis of network topology information. In this eleventh embodiment, instead of searching for a route, the source address SA of the server is used to look up routing table 55, and a packet is transferred to the next upstream node on this basis. The source address SA and the node port number from which a packet is to be output are written in routing table 55, which is constructed on the basis of network topology information.

It is therefore not necessary to hold network topology information in advance in order to search for a route at each node. Instead, it is sufficient to maintain routing table 55. It follows that the amount of information held by the node can be reduced.

Twelfth embodiment

A push network according to a twelfth embodiment of this invention will be described with reference to FIGS. 32 to 35. As illustrations of this twelfth embodiment, FIG. 32 serves to explain the setting of a content filter, FIG. 33 is a block diagram of the main parts of a content filter setting system, FIG. 34 serves to explain a request packet, and FIG. 35 serves to explain a content filter setting packet. In the eighth to the eleventh embodiments, in order to transfer a request packet to the server constituting the source, a search was made for a route or a routing table was looked up, and content filters 1 were set while the request packet was being transferred upstream. As opposed to this, in this twelfth embodiment of the invention, request packets are flooded and if a request packet reaches the server constituting the source, content filters are set from the server to the user.

Figure 32:
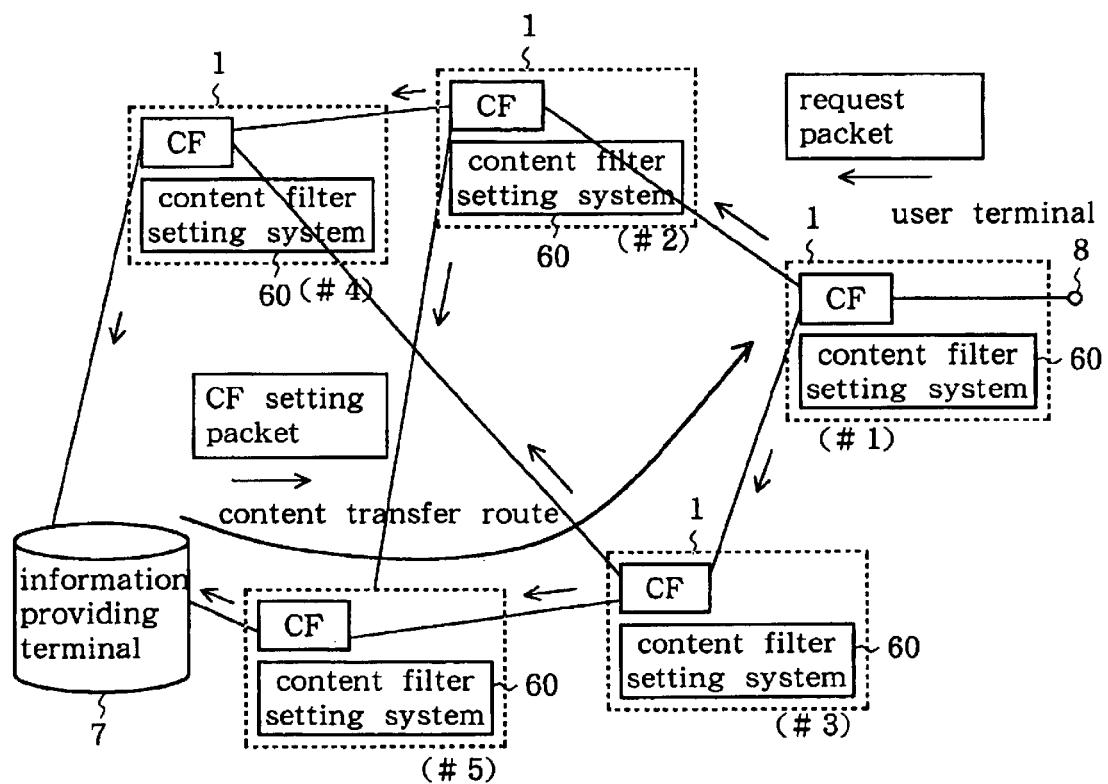
FIG. 32 serves to explain the setting of a content filter according to a twelfth embodiment of this invention.
Figure 33:
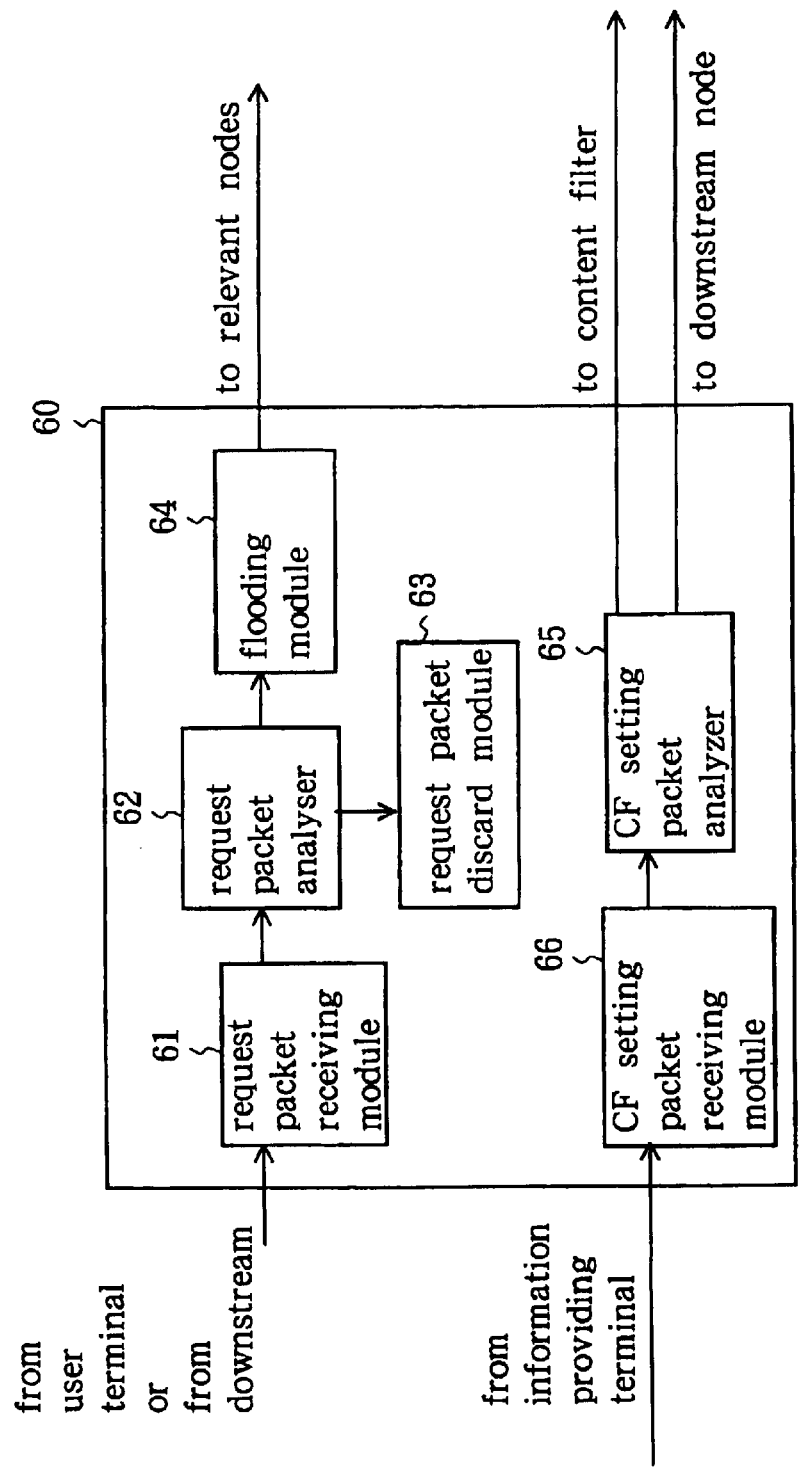
FIG. 33 is a block diagram of the main parts of a content filter setting system in the twelfth embodiment.

As shown in FIG. 32, node #1 which has received a request packet from a user copies and transfers the packet to all ports other than the port at which it was received. Flooding module 64 of content filter setting system 60 shown in FIG. 33 writes, in the received request packet, local node related information and information regarding the distance from the user to the local node, this information serving as sending history information. It then copies the packet and transfers copies to all ports other than the port that received the packet. The distance from the user to the local node can for example be determined from the number of hops or the length of the transmission links. A request packet is propagated through distribution network 10 in this way, and every time it propagates in this manner the distance traveled is cumulatively added. The number of nodes passed is also cumulatively added.

A request packet arrives at node #5 via a plurality of routes: namely, route #1–#2–#5 and route #1–#3–#5. The fact that it is the same request can be decided by means of the content identifier COI and request packet identifier RQ. Request packet identifier RQ is preset so that request packets from all users can be identified. If a request packet with the same content request is received via a plurality of routes, only one is selected by request packet analyzer 62, whereupon the selected packet is copied and transferred to other nodes. Request packets with the same content request which have not been selected are discarded.

The user or the network also presets a hop limit HL for limiting the number of intermediate nodes, and if the number of transit nodes exceeds this hop limit HL, the packet in question is discarded. A request packet is not transferred to transit nodes.

In this twelfth embodiment, if request packets requesting the same content arrive via a plurality of routes, the packet which arrives earliest is selected. The request packet which arrives second is discarded. An alternative method for selecting one of a plurality of request packets is to set a fixed time interval starting from the time when the earliest packet arrives, and to select, from among the request packets that arrive within this time interval, the packet that has traveled the shortest distance or has passed the smallest number of transit nodes.

Request packets that have propagated through the network arrive at the server constituting the source, which selects one request packet in similar manner to a transit node. The route along which this request packet has passed constitutes the route via which the server transfers content to the user, and this content transfer route is written in a content filter setting packet of the sort shown in FIG. 35. The content filter setting packet follows the content transfer route, setting successive content filters by means of content filter setting system 60 of each node on the route.

This twelfth embodiment therefore enables a request packet to be transferred to a server by flooding, without the server address being known.

Thirteenth embodiment

Figure 36:
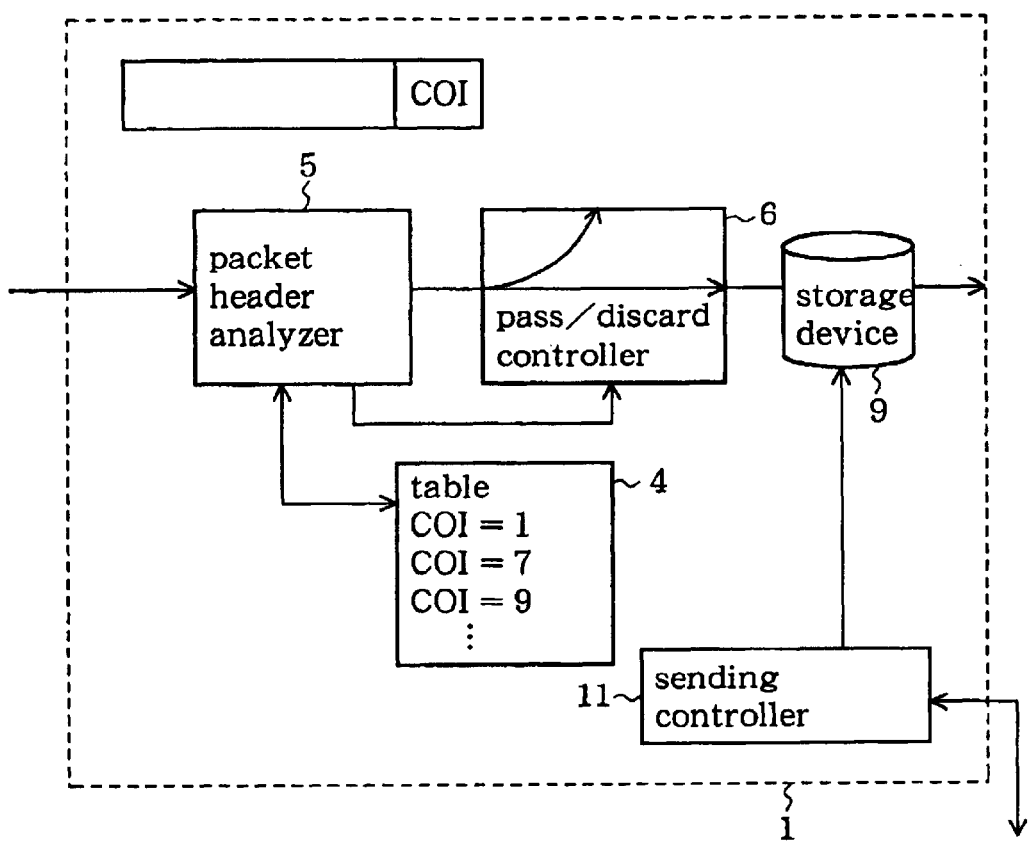
FIG. 36 shows the configuration of a content filter according to a thirteenth embodiment of this invention.

The configuration of a push network according to a thirteenth embodiment of this invention will be described with reference to FIGS. 2, 5 and 36. Although FIG. 2 shows the configuration of a packet in the first embodiment, it applies to the thirteenth embodiment as well. Likewise, although FIG. 5 shows the configuration of a push network according to the second embodiment, it applies to the thirteenth embodiment as well. FIG. 36 shows the configuration of a content filter according to this thirteenth embodiment.

As shown in FIG. 5, in this thirteenth embodiment this invention is a push network comprising copying nodes 2 and distribution network 10, wherein copying nodes 2 are means for copying information held in a packet sent from an information providing terminal 7 and for generating a plurality of packets with this same information, and distribution network 10 is means for distributing packets generated by copying nodes 2 to a plurality of user terminals 8.

A distinguishing feature of this thirteenth embodiment is that, as shown in FIG. 5, content ID adder 3 is provided, this being means for adding to a packet a content identifier for identifying the content of the information held in that packet. A further distinguishing feature of this thirteenth embodiment of the invention is that distribution network 10 comprises content filters 1, these being means for deciding, in accordance with these content identifiers, whether or not to distribute to a given user terminal 8 a packet in which a content identifier has been added. As shown in FIG. 36, a further distinguishing feature of this thirteenth embodiment is that it comprises storage device 9 which is means for temporarily storing a packet which the content filter has decided should be distributed.

As shown in FIG. 36, content filter 1 includes table 4, provided in correspondence with a destination, in which content identifier related information has been registered; and also includes pass/discard controller 6, this being means for passing a packet if the content identifier added to that packet matches the content identifier related information registered in table 4. Content identifier related information can be registered in table 4 in accordance with notification from a user.

As shown in FIG. 2, a packet according to this embodiment of the invention has a content identifier (COI) for identifying content. A user sends to the network content identifiers corresponding to content that the user requires, and content filter 1 in each transit node registers these content identifiers in table 4. Note that the transit nodes themselves are not illustrated and that only content filters 1 in these transit nodes are shown. Each content has a unique content identifier, just as for example a television program has a unique Video Plus code. A packet that an information providing terminal 7 has transferred into distribution network 10 is passed by a content filter if the content identifier that has been added to that packet matches the content identifier related information registered in table 4 of the content filter. On the other hand, a content filter 1 discards a packet if the content identifier added to the packet does not match the content identifier related information registered in table 4 of that content filter.

In this embodiment, if, due to an increase in traffic or some other cause, the packet acceptance rate of a packet transfer destination is less than a prescribed rate, a packet which is to be transferred is temporarily stored in storage device 9. A stored packet is sent after matching the acceptance rate of the packet transfer destination.

By providing storage device 9 of this sort, if there is a node at which the packet acceptance rate is less than a prescribed rate, a packet can still be transferred at the prescribed rate at nodes upstream from this node. This ensures that a decrease in throughput at some nodes does not adversely affect the entire network.

Figure 37:
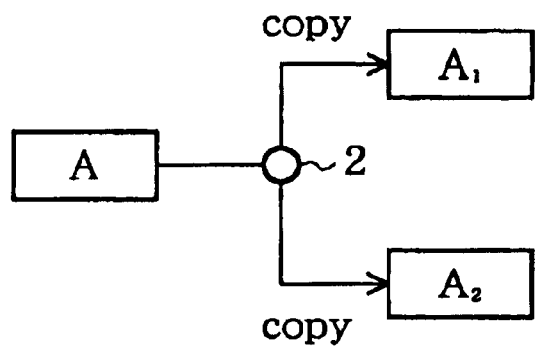
FIG. 37 serves to explain the deletion of memory contents in a storage device.
Figure 37:
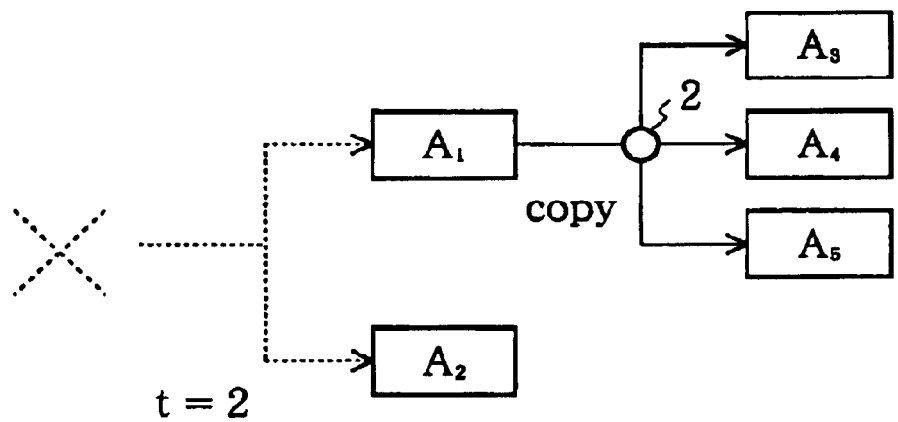
Figure 37:
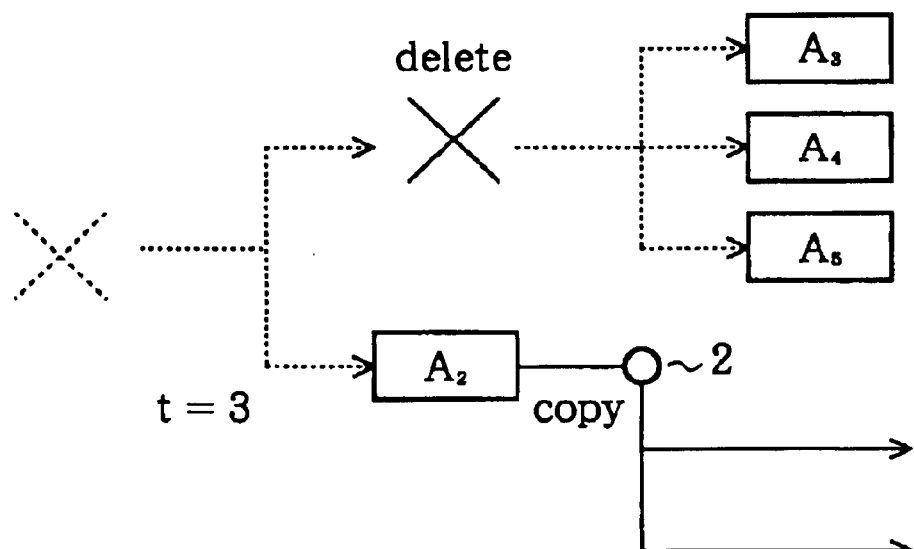

FIG. 37 serves to explain the deletion of memory contents from storage device 9, with t indicating time. Each time content being transferred through distribution network 10 in multicast manner is copied to a lower level node, it is deleted. If A is copied to two nodes as A1 and A2 at t=1, then A is deleted and A1 copied to three nodes as A3, A4 and A5 at t=2. Because the copying has been completed, A1 is deleted at t=3 and simultaneously A2 is copied to lower level nodes. In other words, content is copied and transferred in pipeline fashion. It follows that even if there is a bottleneck at a certain distribution destination, its effects remain local and do not extend throughout the entire network.

Thus, provided that an information providing terminal 7 distributes content at regular intervals, packets will continue to be transferred in multicast fashion to users who have made a request in advance. Storage device 9 in each node is given necessary and sufficient capacity.

Fourteenth embodiment

Figure 38:
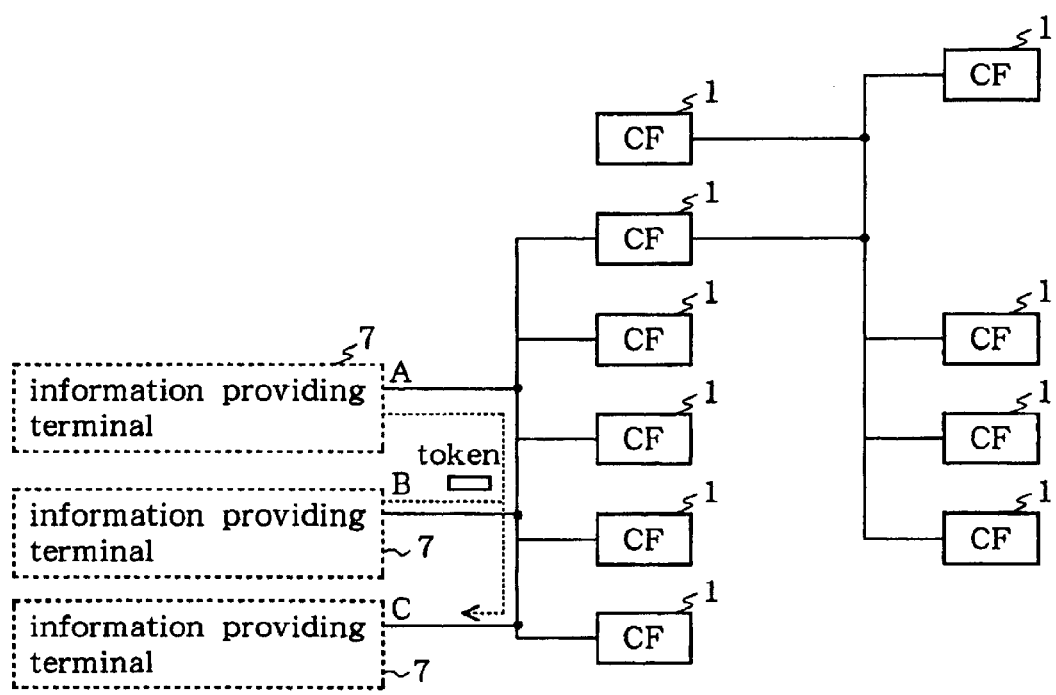
FIG. 38 shows the configuration of a push network according to a fourteenth embodiment of this invention.

A push network according to a fourteenth embodiment of this invention will be described with reference to FIG. 38, which shows the configuration of this push network. In this fourteenth embodiment there are a plurality of information providing terminals 7, and in order for these information providing terminals to distribute content concurrently, a token is circulated and the right to send is obtained in the order A, B, C. If an information providing terminal 7 does not have content to be sent, it hands over the sending right token to the next information providing terminal 7. Use of a token in this manner ensures that if there are a plurality of sources of content, content can still be distributed freely without mutual collision.

Fifteenth embodiment

Figure 39:
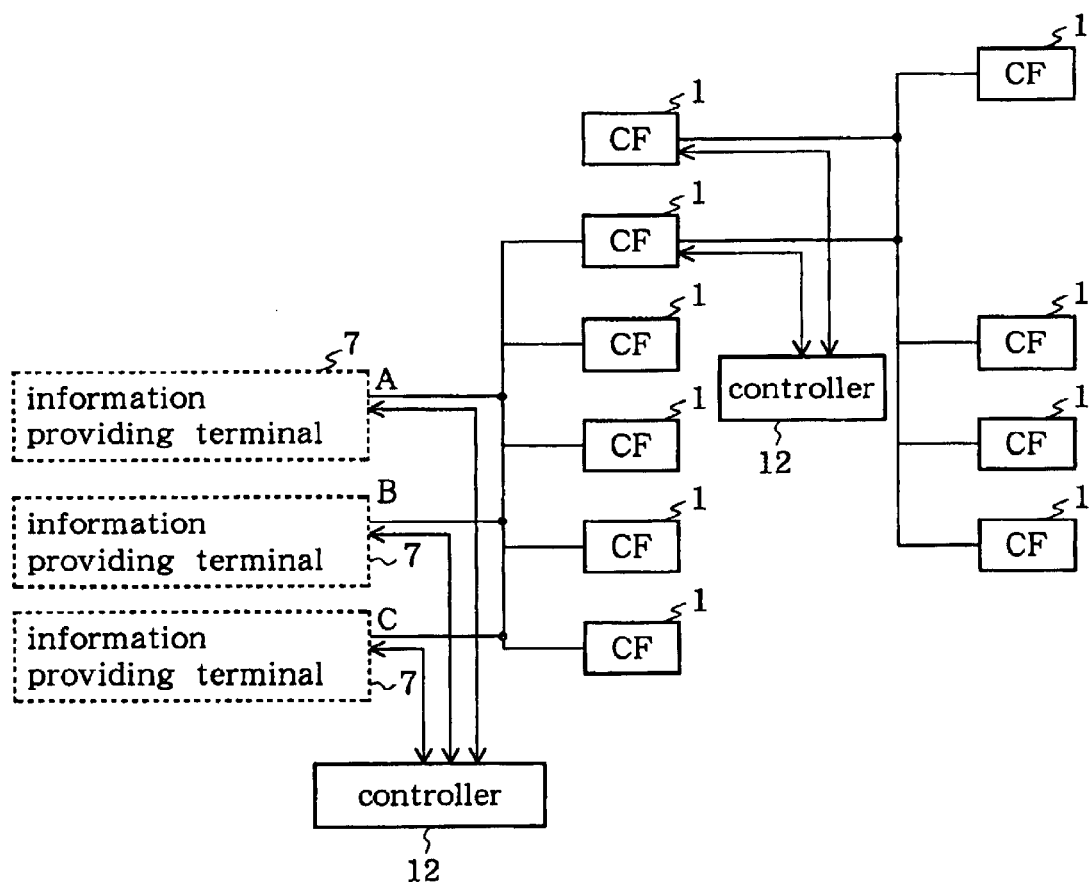
FIG. 39 shows the configuration of a push network according to a fifteenth embodiment of this invention.

A push network according to a fifteenth embodiment of this invention will be described with reference to FIG. 39, which shows the configuration of this push network. In this fifteenth embodiment there are a plurality of information providing terminals 7, and transit nodes containing a content filter 1 are provided in a hierarchical structure. A controller 12 is provided for the distribution network at each level of the hierarchy. The example shown in FIG. 39 is a system which gives sending permission to whichever of A, B and C is the most suitable information providing terminal.

In this embodiment, the most suitable information providing terminal 7 or transit node is the one relative to which there is little traffic at downstream transit nodes, and which is capable of transferring packets smoothly. A controller 12 therefore collects traffic information at each level of the hierarchy and selects the most suitable information providing terminal 7 or transit node on this basis.

Sixteenth embodiment

Figure 40:
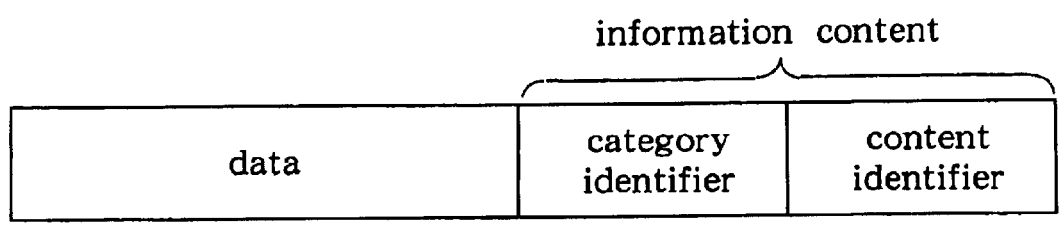
FIG. 40 shows the configuration of a packet according to a sixteenth embodiment of this invention.

The configuration of a push network according to a sixteenth embodiment of this invention will be described with reference to FIGS. 40 to 42. As illustrations of this sixteenth embodiment, FIG. 40 shows the configuration of a packet, FIG. 41 is a block diagram of the main parts of a push network, and FIG. 42 is a block diagram of the main parts of a content filter.

Figure 41:
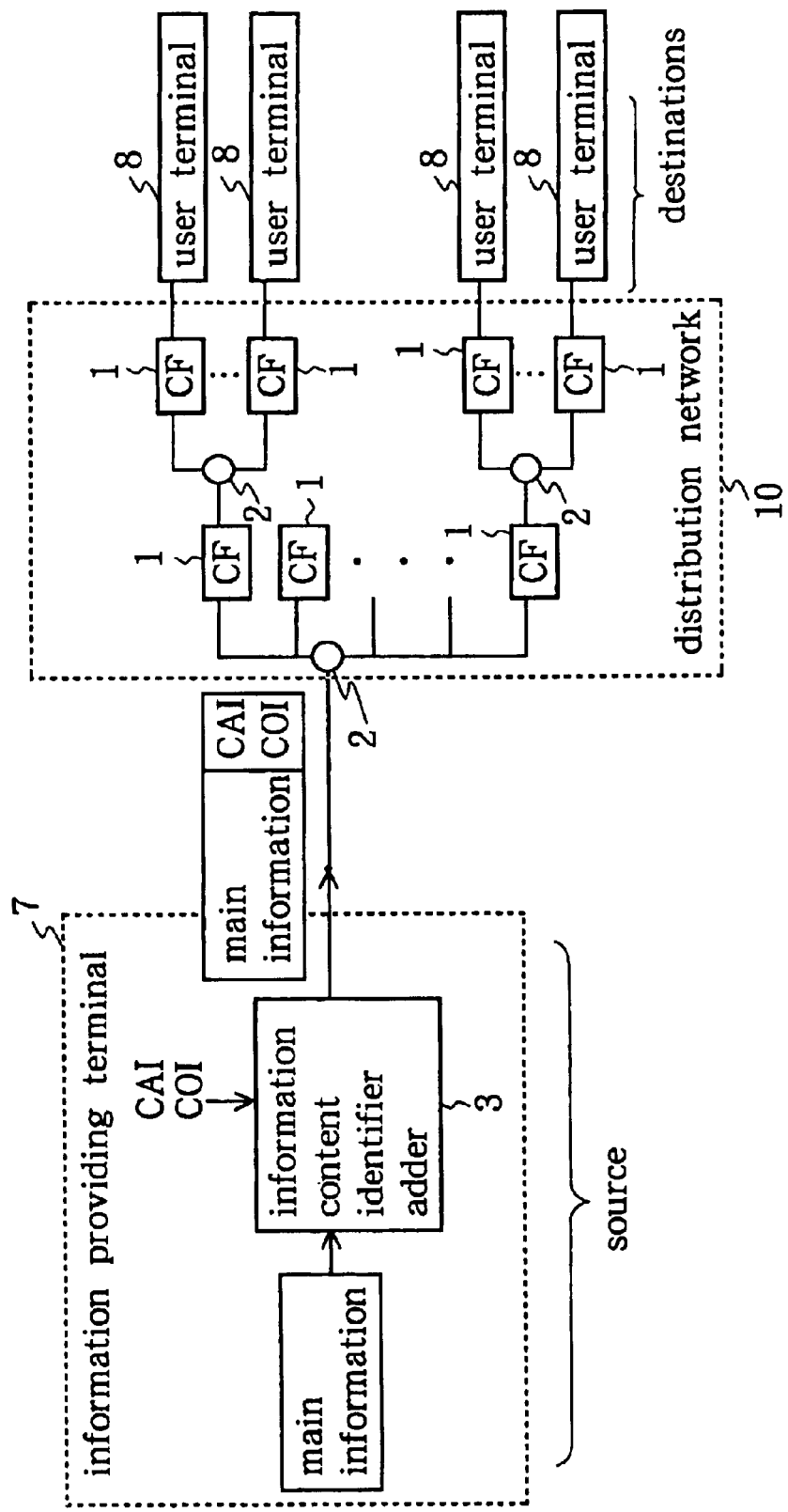
FIG. 41 is a block diagram of the main parts of a push network in the sixteenth embodiment.

As shown in FIG. 41, in this sixteenth embodiment the invention is a push network comprising copying nodes 2 and distribution network 10, wherein copying nodes 2 are means for copying information held in a packet sent from information providing terminal 7 and for generating a plurality of packets with this same information, and distribution network 10 is means for distributing packets generated by copying nodes 2 to a plurality of user terminals 8.

A distinguishing feature of this sixteenth embodiment of the invention is that, as shown in FIG. 41, information content identifier adder 3 is provided, this being means for adding to a packet a content identifier (COI) for identifying the content of the information held in that packet, and a category identifier (CAI) for identifying the category to which that content belongs. A further distinguishing feature of the invention according to this embodiment is that distribution network 10 comprises content filters 1, these being means for deciding, in accordance with the category identifiers and content identifiers, whether or not to distribute a packet to a given user terminal.

Figure 42:
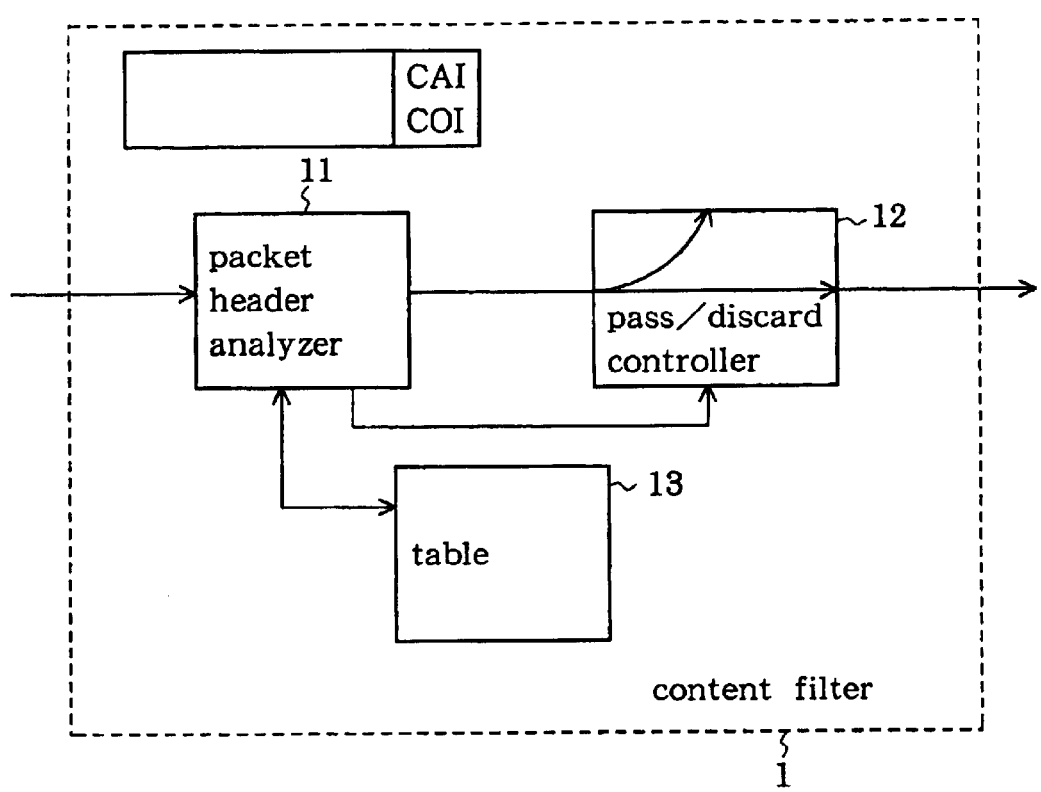
FIG. 42 is a block diagram of the main parts of a content filter in the sixteenth embodiment.

As shown in FIG. 42, a content filter 1 includes table 13, provided in correspondence with a destination, in which has been registered information relating to category identifiers and information relating to content identifiers corresponding to these category identifiers; and also includes packet header analyzer 11 and pass/discard controller 12, these being means for passing a packet if the category identifier added to that packet matches the category identifier related information registered in table 13, and if the content identifier added to that same packet matches the content identifier related information registered in table 13 in correspondence with said category identifier.

The category identifier and content identifier related information, which correspond to information content that a user wishes to receive, or to information content that a user wishes to reject, can be registered in table 13 in accordance with notification from the user. Alternatively, category identifier related information corresponding to information content that an information provider wishes to distribute or to prohibit from being distributed, can be registered in table 13 in correspondence with a destination, in accordance with notification from the information provider.

The operation of this sixteenth embodiment of the invention will now be described. As shown in FIG. 41, an information provider adds to the main information, by means of information content identifier adder 3 of information providing terminal 7, a category identifier (CAI) and a content identifier (COI) corresponding to the content of this main information. A packet in which a category identifier and a content identifier have been added to the main information is transferred to distribution network 10. As shown in FIG. 40, the information content identifier that is added to a packet in this manner is split hierarchically into a field that shows the category and a field that shows the content.

Figures 43, 44:
FIG. 43 shows an example of registration in table 13.
FIG. 44 shows the configuration of a conventional packet.
Figure 45:
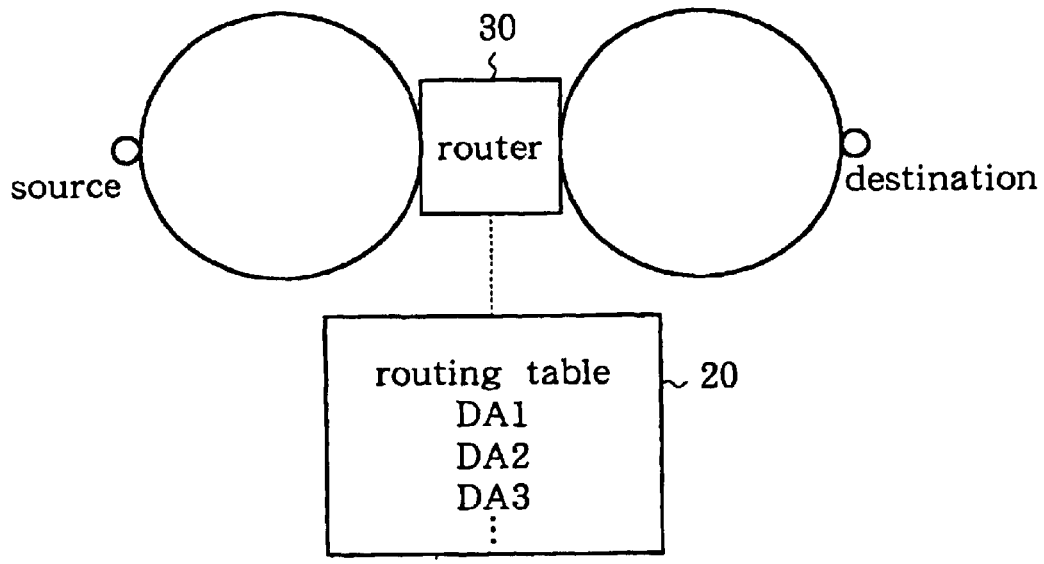
FIG. 45 shows the configuration of a conventional push network.
Figure 46:
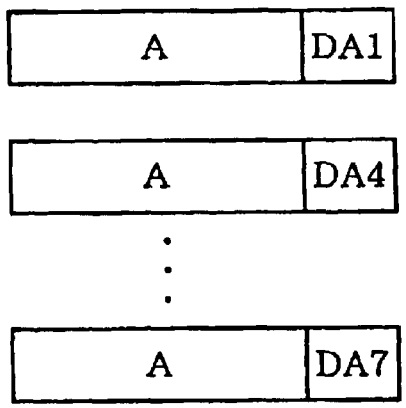
FIG. 46 shows the configuration of a conventional multicast packet.

A user sends to distribution network 10 a category identifier and/or a content identifier corresponding to content which the user requires, whereupon content filter 1 in each transit node stores this category identifier and/or content identifier in table 13. FIG. 43 shows an example of registration in table 13. A packet that has been transferred into distribution network 10 from a source has the category identifier and content identifier written in its header analyzed by packet header analyzer 11 of a content filter 1, and if said category identifier and content identifier match the category identifier and content identifier registered in table 13, the packet is passed, while if they do not match, the packet is discarded. Thus, provided that a source distributes content at regular intervals, packets will continue to be transferred in multicast fashion to users who have made a request in advance.

For example, if a user who wants cooking recipe information wishes to receive all recipe information, a category identifier corresponding to "cooking recipes" is registered in distribution network 10. However, if the user wishes to receive only specific cooking recipe information which constitutes only a portion of the available cooking recipe information, a content identifier corresponding to specific cooking recipes is registered in distribution network 10.

Alternatively, an information provider can register, in a table 13 in distribution network 10, a category identifier corresponding to a category that the provider will not distribute to its lower level network. This ensures that a prescribed category can be filtered using a category identifier in such manner that it is not distributed to a lower level network. In other words, as shown in FIG. 43, if there is a category identifier corresponding to an information category that will not be distributed, independently of content identifier, then there may be a category identifier corresponding to an information category that will pass unconditionally. A category identifier that allows packets to pass unconditionally can be used for general multicasting.

If a particular category identifier is used to prevent distribution, it will also be possible to prohibit the distribution of information with content that is detrimental to specific users, or to prevent the setting of content identifiers by users who have not received enterprise security management approval. It is thus possible to create categories within which users are able to set a desired content identifier, and categories where this is not possible.

A detailed description of the registering and deletion of content identifiers and/or category identifiers in or from table 13 in this sixteenth embodiment of the invention, in which one or both of content and category identifiers are used, will be similar to the description given in previous embodiments regarding registering and deletion of content identifiers in and from table 13.

An embodiment of this invention using category identifiers alone could also be described by simply replacing the terms "content" and "content identifier" in the first to the fifteenth embodiments of the invention with the terms "category" and "category identifier".

What is claimed is:

1. A push network comprising:
means for copying information held in a packet sent from an information providing terminal and for generating a plurality of packets with the same information;
means for distributing the plurality of packets thereby generated to a plurality of user terminals;
means within said information proving terminal for adding to a packet a content identifier;
wherein the information provided by said information providing terminal is assigned a unique content identifier or both the content identifier and the category identifier for identifying the category to which the content of the packet belongs;
wherein the distributing means comprises means for deciding, in accordance with the content identifier, whether or not to distribute that packet to a given user terminal;
wherein the decision means includes: a table, provided in correspondence with a destination, in which content identifier related information has been registered; and means for passing a packet if the content identifier added to that packet matches the content identifier related information registered in the table;
wherein the decision means comprises means which, if no packet having the same content identifier as that of passed packets arrives within a fixed time interval after the final packet has passed, deletes from the table the information relating to that content identifier; and
wherein the information providing terminal comprises means for transmitting, within the aforementioned fixed time interval, a dummy packet to which a prescribed content identifier has been added.

2. A push network comprising:
means for copying information held in a packet sent from an information providing terminal and for generating a plurality of packets with the same information;
means for distributing the plurality of packets thereby generated to a plurality of user terminals;
means within said information proving terminal for adding to a packet a content identifier;
wherein the information provided by said information providing terminal is assigned a unique content identifier or both the content identifier and the category identifier for identifying the category to which the content of the packet belongs;
wherein the distributing means comprises means for deciding, in accordance with the content identifier, whether or not to distribute that packet to a given user terminal;
wherein the decision means includes: a table, provided in correspondence with a destination, in which content identifier related information has been registered; and means for passing a packet if the content identifier added to that packet matches the content identifier related information registered in the table; and
wherein the decision means comprises means for deleting content identifier related information from the table when it receives a packet giving notification that receiving has been completed, said packet having been sent from a node or user terminal that has received packets to which the corresponding content identifier has been added.

3. A push network comprising:
means for copying information held in a packet sent from an information providing terminal and for generating a plurality of packets with the same information;
means for distributing the plurality of packets thereby generated to a plurality of user terminals;
means within said information proving terminal for adding to a packet a content identifier;
wherein the information provided by said information providing terminal is assigned a unique content identifier or both the content identifier and the category identifier for identifying the category to which the content of the packet belongs;

wherein the distributing means comprises means for deciding, in accordance with the content identifier, whether or not to distribute that packet to a given user terminal;

wherein the decision means includes: a table, provided in correspondence with a destination, in which content identifier related information has been registered; and means for passing a packet if the content identifier added to that packet matches the content identifier related information registered in the table;

wherein means is provided for registering content identifier related information in the table in accordance with notification from a user; and wherein a separate registering means is provided for each decision means.

4. A push network as claimed in claim 3, wherein a registering means comprises: means for storing, in correspondence with content, information indicative of the information providing terminal constituting the source of packets with that content; means for searching, in accordance with the stored contents of this storage means, for a route from that information providing terminal to a given user terminal; and means for transferring an arriving request packet in accordance with information, written in that request packet, regarding the route to the information providing terminal; wherein this transferring means includes means which, when there is no information in an arriving request packet regarding the route to the information providing terminal, writes said information in that request packet, in accordance with the routing information found by the search means.

5. A push network as claimed in claim 3, wherein a registering means comprises: means for storing, in correspondence with content, information indicative of the information providing terminal constituting the source of packets with that content; means for searching, in accordance with the stored contents of this storage means, for a route to the information providing terminal written in an arriving request packet; and means which, in accordance with the results of the search by this search means, updates the routing information in the aforementioned request packet.

6. A push network as claimed in claim 3, wherein a registering means comprises means for storing, in correspondence with information relating to the address of an information providing terminal, said information having been written in an arriving request packet, information relating to an output port to be used for routing.

7. A push network as claimed in claim 3, wherein a registering means comprises: means for sending an arriving request packet to all output routes connected to the local node; means for writing in the request packets information relating to the sending history of this sending means; means for detecting, in accordance with this sending history information, the number of hops made by a request packet; and means which, when the same packet arrives from a plurality of routes, selects one of these packets in accordance with the results obtained by this detection means.

8. A push network comprising:

means for copying information held in a packet sent from an information providing terminal and for generating a plurality of packets with the same information;

means for distributing the plurality of packets thereby generated to a plurality of user terminals;

means within said information proving terminal for adding to a packet a content identifier or both the content identifier and a category identifier;

wherein the information provided by said information providing terminal is assigned a unique content identifier or both the content identifier and the category identifier for identifying the category to which the content of the packet belongs;

wherein the distributing means comprises means for deciding, in accordance with the content identifier, or in accordance with one or both of the content identifier and category identifier, whether or not to distribute that packet to a given user terminal;

wherein means is provided for temporarily storing a packet which the decision means has decided to distribute; and wherein the temporary storage means comprises means for temporarily storing a packet to be transferred to a transfer destination when the packet acceptance rate of that packet transfer destination is less than a prescribed rate.

9. A push network comprising:

means for copying information held in a packet sent from an information providing terminal and for generating a plurality of packets with the same information;

means for distributing the plurality of packets thereby generated to a plurality of user terminals;

means within said information proving terminal for adding to a packet a content identifier or both the content identifier and a category identifier;

wherein the information provided by said information providing terminal is assigned a unique content identifier or both the content identifier and the category identifier for identifying the category to which the content of the packet belongs;

wherein the distributing means comprises means for deciding, in accordance with the content identifier, or in accordance with one or both of the content identifier and category identifier, whether or not to distribute that packet to a given user terminal; and wherein a plurality of information providing terminals are provided, and there is provided means which causes a token to circulate among these terminals, this token giving permission to an information providing terminal to send; and means is also provided which causes content to be sent from the information providing terminal that has received the token.

10. A push network comprising:

means for copying information held in a packet sent from an information providing terminal and for generating a plurality of packets with the same information;

means for distributing the plurality of packets thereby generated to a plurality of user terminals;

means within said information proving terminal for adding to a packet a content identifier or both the content identifier and a category identifier;

wherein the information provided by said information providing terminal is assigned a unique content identifier or both the content identifier and the category identifier for identifying the category to which the content of the packet belongs;

wherein the distributing means comprises means for deciding, in accordance with the content identifier, or in accordance with one or both of the content identifier and category identifier, whether or not to distribute that packet to a given user terminal; and wherein transit nodes are arranged hierarchically between information providing terminals and user terminals, and a plurality of information providing terminals or transit nodes are provided in each layer of this hierarchy; wherein each layer of the hierarchy comprises: means for collecting traffic information for that hierarchical layer; means which gives sending permission to an information providing terminal and/or transit node in accordance with the traffic information collected by this collecting means; and means which causes content to be sent from the information providing terminal and/or transit node that has received sending permission.

11. A push network comprising:

means for copying information held in a packet sent from an information providing terminal and for generating a plurality of packets with the same information;

means for distributing the plurality of packets thereby generated to a plurality of user terminals;

means within said information proving terminal for adding to a packet a content identifier or both the content identifier and a category identifier;

wherein the information provided by said information providing terminal is assigned a unique content identifier or both the content identifier and the category identifier for identifying the category to which the content of the packet belongs;

wherein the distributing means comprises means for deciding, in accordance with the content identifier, or in accordance with one or both of the content identifier and category identifier, whether or not to distribute that packet to a given user terminal;

wherein means is provided for adding to a packet one or both of a content identifier and a category identifier; and the distributing means comprises means for deciding, in accordance with this content identifier and/or category identifier, whether or not to distribute that packet to a given user terminal; and wherein the decision means includes a table, provided in correspondence with a destination, in which has been registered information relating to a category identifier and/or to a content identifier corresponding to this category identifier; and also includes means which passes a packet if the category identifier given to that packet matches the category identifier related information registered in the table, and if the content identifier given to the packet matches the content identifier related information registered in the table in correspondence with this category identifier.

12. A push network as claimed in claim 11, wherein means is provided for registering in the table, in accordance with notification from a user, information relating to a content identifier, and/or a category identifier, corresponding to information content which that user wishes to receive, or to information content which the user wishes to reject.

13. A push network as claimed in claim 11, wherein means is provided for registering in the table, in correspondence with a destination and in accordance with notification from an information provider, information relating to a content identifier, and/or a category identifier, corresponding to information content which that information provider wishes to distribute or to prohibit from being distributed.

14. A push network as claimed in claim 11, wherein means is provided for deleting from the table information relating to a content identifier and/or a category identifier registered in the table, once a series of packets containing that content identifier and/or category identifier have passed.

15. A push network as claimed in claim 14, wherein the deleting means comprises means for deleting from the table information relating to a content identifier and/or a category identifier after a prescribed time interval has elapsed after the series of packets have passed.

16. A push network as claimed in claim 11, wherein the deleting means comprises means for deleting from the table, at a predetermined time, information relating to a content identifier and/or a category identifier registered in the table.

17. A push network as claimed in claim 11, wherein the decision means comprises means for receiving a packet requesting deletion of information relating to a content identifier and/or a category identifier, and for deleting the corresponding information from the aforementioned table.

18. A push network as claimed in claim 17, wherein a user terminal comprises means for transmitting a packet requesting deletion of information relating to a content identifier and/or a category identifier.

19. A push network as claimed in claim 17, wherein an information providing terminal comprises means for transmitting a packet requesting deletion of information relating to a content identifier and/or a category identifier.

20. A push network as claimed in claim 11, wherein the decision means comprises means which, if no packet having the same content identifier and/or category identifier as passed packets arrives within a fixed time interval after the final packet has passed, deletes from the table the information relating to that content identifier and/or category identifier.

21. A push network as claimed in claim 20, wherein the information providing terminal comprises means for transmitting, within the aforementioned fixed time interval, a dummy packet to which a prescribed content identifier and/or category identifier has been added.

22. A push network as claimed in claim 11, wherein the decision means comprises means for deleting from the table information relating to a content identifier and/or a category identifier when it receives a packet giving notification that receiving has been completed, said packet having been sent from a node or user terminal that has received packets with the corresponding content identifier and/or category identifier.

23. A push network as claimed in claim 12, wherein the registering means comprises means for receiving a request packet in which has been written a content identifier and/or a category identifier notified by a user, and means for registering content identifier and/or category identifier related information in the table in accordance with the content identifier and/or category identifier written in the request packet received by the aforementioned receiving means.

24. A push network as claimed in claim 12, wherein one registering means is provided for a plurality of decision means, said registering means comprising: means for storing, in correspondence with content and/or category, information indicative of the information providing terminal constituting the source of packets with that content and/or of that category; means for searching for a route from that information providing terminal to a given user terminal in accordance with the stored contents of this storage means; and means which, in accordance with the result of the search conducted by this searching means, registers content identifier and/or category identifier related information notified by a user, in the tables of the decision means along the route in question.

25. A push network as claimed in claim 12, wherein a separate registering means is provided for each decision means.

26. A push network as claimed in claim 25, wherein a registering means comprises: means for storing, in correspondence with content and/or category, information indicative of the information providing terminal constituting the source of packets with this content and/or of this category; means for searching, in accordance with the stored contents of this storage means, for a route from that information providing terminal to a given user terminal; and means for transferring an arriving request packet in accordance with information, written in the request packet, regarding the route to the information providing terminal; wherein this transferring means includes means which, when there is no information in an arriving request packet regarding the route to the information providing terminal, writes said information in that request packet, in accordance with the routing information found by the search means.

27. A push network as claimed in claim 25, wherein a registering means comprises: means for storing, in correspondence with content and/or category, information indicative of the information providing terminal constituting the source of packets with that content and/or of that category; means for searching, in accordance with the stored contents of this storage means, for a route to the information providing terminal written in an arriving request packet; and means which, in accordance with the result of the search by this search means, updates the routing information in the aforementioned request packet.

28. A push network as claimed in claim 25, wherein a registering means comprises means for storing, in correspondence with information relating to the address of an information providing terminal, said information having been written in an arriving request packet, information relating to an output port to be used for routing.

29. A push network as claimed in claim 25, wherein a registering means comprises: means for sending an arriving request packet to all output routes connected to the local node; means for writing in the request packets information relating to the sending history of this sending means; means for detecting, in accordance with this sending history information, the number of hops made by a request packet; and means which, when the same packet arrives from a plurality of routes, selects one of these packets in accordance with the results obtained by this detection means.

* * * * *